(12) United States Patent
Nelson et al.

(10) Patent No.: US 12,180,374 B2
(45) Date of Patent: Dec. 31, 2024

(54) PROTEIN-BASED RESINS FOR ADDITIVE MANUFACTURING

(71) Applicant: University of Washington, Seattle, WA (US)

(72) Inventors: Alshakim Nelson, Seattle, WA (US); Siyami Millik, Seattle, WA (US); Ryan Thomas Shafranek, Seattle, WA (US); Patrick Smith, Seattle, WA (US)

(73) Assignee: University of Washington, Seattle, WA (US)

( * ) Notice: Subject to any disclaimer, the term of this patent is extended or adjusted under 35 U.S.C. 154(b) by 320 days.

(21) Appl. No.: 17/619,178

(22) PCT Filed: Jun. 16, 2020

(86) PCT No.: PCT/US2020/037947
§ 371 (c)(1),
(2) Date: Dec. 14, 2021

(87) PCT Pub. No.: WO2020/257206
PCT Pub. Date: Dec. 24, 2020

(65) Prior Publication Data
US 2022/0306877 A1   Sep. 29, 2022

Related U.S. Application Data

(60) Provisional application No. 62/863,137, filed on Jun. 18, 2019.

(51) Int. Cl.
| C09D 11/04 | (2006.01) |
| B33Y 10/00 | (2015.01) |
| B33Y 70/00 | (2020.01) |
| B33Y 80/00 | (2015.01) |
| C09D 11/101 | (2014.01) |
| C09D 11/30 | (2014.01) |

(52) U.S. Cl.
CPC .............. *C09D 11/04* (2013.01); *B33Y 10/00* (2014.12); *B33Y 70/00* (2014.12); *B33Y 80/00* (2014.12); *C09D 11/101* (2013.01); *C09D 11/30* (2013.01)

(58) Field of Classification Search
None
See application file for complete search history.

(56) References Cited

U.S. PATENT DOCUMENTS

| 4,451,568 A | 5/1984 | Schneider et al. |
| 5,063,081 A | 11/1991 | Cozzette et al. |
| 9,204,962 B2 | 12/2015 | Silvestrini |
| 10,435,573 B2 | 10/2019 | Xu et al. |
| 2008/0004686 A1 | 1/2008 | Hunt et al. |
| 2014/0163303 A1 | 6/2014 | Bourke et al. |
| 2017/0143831 A1 | 5/2017 | Varanasi et al. |
| 2019/0106673 A1 | 4/2019 | Skardal |
| 2019/0194460 A1 | 6/2019 | Caceres et al. |

FOREIGN PATENT DOCUMENTS

| EP | 3326661 A1 | 5/2018 |
| WO | WO 2018/071639 A1 | 4/2018 |
| WO | WO 2019/195256 A1 | 10/2019 |

OTHER PUBLICATIONS

Smith, P. T. et al. Additive Manufacturing of Bovine Serum Albumin-based Hydrogels and Bioplastics. ChemRxiv. May 9, 2019. (Year: 2019).*
Adamczyk, M.; Buko, A.; Chen, Y.; Fishpaugh, J. R.; Gebler, J. C.; Johnson, D. D. Characterization of Protein-Hapten Conjugates. 1. Matrix—Assisted Laser Desorption Ionization Mass Spectrometry of Immuno BSA-Hapten Conjugates and Comparison with Other. *Bioconjugate Chem.* Nov. 1, 1994, 5, 631-635.
Appuhamillage, G. A.; Chartrain, N.; Meenakshisundaram, V.; Feller, K. D.; Williams, C. B.; Long, T. E. 110th Anniversary: Vat Photopolymerization-Based Additive Manufacturing: Current Trends and Future Directions in Materials Design. *Ind. Eng. Chem. Res.* Jul. 24, 2019, 58, 15109-15118.
ASTM D4473, Standard Test Method for Plastics: Dynamic Mechanical Properties: Cure Behavior; ASTM International: West Conshohocken, PA, 2016.
Bagheri, A.; Jin, J. Photopolymerization in 3D Printing. *ACS Appl. Polym. Mater.* Feb. 20, 2019, 1, 593-611.
Baler, K.; Michael, R.; Szleifer, I.; Ameer, G. A. Albumin Hydrogels Formed by Electrostatically Triggered Self-Assembly and Their Drug Delivery Capability. *Biomacromolecules* Sep. 5, 2014, 15, 3625-3633.
Bhattacharjee, N.; Parra-Cabrera, C.; Kim, Y. T.; Kuo, A. P.; Folch, A. Desktop-Stereolithography 3D-Printing of a Poly (Dimethylsiloxane)-Based Material with Sylgard-184 Properties. *Adv. Mater.* Apr. 14, 2018, 30, 1800001.
Castilho, M. D.; Malda, J.; Levato, R.; Alcala-Orozco, C. R.; Melchels, F. P. W.; Gawlitta, D.; Hooper, G. J.; Woodfield, T. B. F.; Costa, P. F.; Lim, K. S.; et al. Bio-Resin for High Resolution Lithography-Based Biofabrication of Complex Cell-Laden Constructs. *Biofabrication* May 11, 2018, 10 (3), 034101. https://doi.org/10.1088/1758-5090/aac00c.
Chen, J.; Ma, X.; Dong, Q.; Song, D.; Hargrove, D.; Vora, S.; Ma, A.; Lu, X.; Lei, Y. Self-Healing of Thermally-Induced, Biocompatible and Biodegradable Protein Hydrogel. *RSC Adv.* Jun. 7, 2016, 6, 56183-56192.

(Continued)

*Primary Examiner* — Robert M Kelly
(74) *Attorney, Agent, or Firm* — Katherine M. Mead; Lee & Hayes

(57) ABSTRACT

Methods of fabricating 3D printed structures from biocompatible proteins include forming a photoreactive, proteinaceous resin, and 3D printing biocompatible structures from the resin by the patterned application of light in a select wavelength to cure the resin into the desired structures. Suitable photoreactive proteinaceous resins can be formed by reacting an aqueous solution of an acrylated or methacrylated globular protein with a photoreactive comonomer or photoinitiator. Structures printed from the photoreactive, proteinaceous resin can be photo-cured and dried to form bioplastic structures.

20 Claims, 15 Drawing Sheets

(56) References Cited

OTHER PUBLICATIONS

Childers, E. P.; Wang, M. O.; Becker, M. L.; Fisher, J. P.; Dean, D. 3D Printing of Resorbable Poly (Propylene Fumarate) Tissue Engineering Scaffolds. *MRS Bull.* Feb. 12, 2015, 40, 119-126.
Choi, J.; Wicker, R.; Lee, S.; Choi, K.; Ha, C.; Chung, I. Fabrication of 3D Biocompatible/Biodegradable Micro-Scaffolds Using Dynamic Mask Projection Microstereolithography. *J. Mater. Process. Technol.* May 13, 2009, 209, 5494-5503.
Clark, A. H.; Kavanagh, G. M.; Ross-Murphy, S. B. Globular Protein Gelation—Theory and Experiment. *Food Hydrocolloids* Nov. 19, 2001, 15, 383-400.
De Beer, M. P.; van der Laan, H. L.; Cole, M. A.; Whelan, R. J.; Burns, M. A.; Scott, T. F. Rapid, Continuous Additive Manufacturing by Volumetric Polymerization Inhibition Patterning. *Sci. Adv.* Jan. 11, 2019, 5, No. eaau8723.
Dikovsky, D.; Bianco-Peled, H.; Seliktar, D. The Effect of Structural Alterations of PEGFibrinogen Hydrogel Scaffolds on 3-D Cellular Morphology and Cellular Migration. *Biomaterials* Oct. 21, 2005, 27, 1496-1506. DOI: 10.1016/j.biomaterials.2005.09.038.
Dilla, R. A.; Motta, C. M. M.; Snyder, S. R.; Wilson, J. A.; Wesdemiotis, C.; Becker, M. L. Synthesis and 3D Printing of PEGPoly(Propylene Fumarate) Diblock and Triblock Copolymer Hydrogels. *ACS Macro Lett.* Oct. 1, 2018, 7, 1254-1260.
Ding, R.; Du, Y.; Goncalves, R.; Francis, L.; Reineke, T. Sustainable near UV-Curable Acrylates Based on Natural Phenolics for Stereolithography 3D Printing. *Polym. Chem.* Feb. 5, 2019, 10, 1067.
Dolinski, N. D.; Page, Z. A.; Callaway, E. B.; Eisenreich, F.; Garcia, R. V.; Chavez, R.; Bothman, D. P.; Hecht, S.; Zok, F. W.; Hawker, C. J. Solution Mask Liquid Lithography (SMaLL) for One-Step, Multimaterial 3D Printing. *Adv. Mater.* Jun. 21, 2018, 30, 1800364.
Ewoldt, R. H.; Johnston, M. T.; Caretta, L. M. Complex Fluids in Biological Systems; Spagnolie, S., Ed.; Springer Science+Business Media: New York, 2015.
Gao, W.; Zhang, Y.; Ramanujan, D.; Ramani, K.; Chen, Y.; Williams, C. B.; Wang, C. C. L.; Shin, Y. C.; Zhang, S.; Zavattieri, P. D. Computer-Aided Design The Status, Challenges, and Future of Additive Manufacturing In. *Comput. Des.* Apr. 17, 2015, 69, 65-89.
Gauvin, R.; Chen, Y.-C.; Lee, J. W.; Soman, P.; Zorlutuna, P.; Nichol, J. W.; Bae, H.; Chen, S.; Khademhosseini, A. Microfabrication of Complex Porous Tissue Engineering Scaffolds Using 3D Projection Stereolithography. *Biomaterials* Feb. 24, 2012, 33, 3824-3834.
Gosal, W. S.; Ross-Murphy, S. B. Globular Protein Gelation. *Curr. Opin. Colloid Interface Sci.* Jul. 2000, 5, 188-194.
Hegde, M.; Meenakshisundaram, V.; Chartrain, N.; Sekhar, S.; Tafti, D.; Williams, C. B.; Long, T. E. 3D Printing All-Aromatic Polyimides Using Mask-Projection Stereolithography: Processing the Nonprocessable. *Adv. Mater.* Jun. 19, 2017, 29, 1701240.
Hiemenz, P. C.; Lodge, T. Polymer Chemistry, 2nd ed.; CRC Press: Boca Raton, FL, 2007.
Hinczewski, C.; Corbel, S.; Chartier, T. Ceramic Suspensions Suitable for Stereolithogiaphy. *J. Eur. Ceram. Soc.* 18, 583-590, published online Jul. 7, 1999.
International Search Report and Written Opinion issued for International Application No. PCT/US2020/037947 on Dec. 3, 2020.
Ji, S.; Guvendiren, M. Recent Advances in Bioink Design for 3D Bioprinting of Tissues and Organs. *Front. Bioeng. Biotechnol.* 2017, 5 (April), 1-8. https://doi.org/10.3389/fbioe.2017.00023.
Johnston, T. G.; Fellin, C. R.; Carignano, A.; Nelson, A., "Poly(Alkyl Glycidyl Ether) Hydrogels for Harnessing the Bioactivity of Engineered Microbes." *Faraday Discuss.*, Mar. 6, 2019.
Kim, S. H.; Yeon, Y. K.; Lee, J. M.; Chao, J. R.; Lee, Y. J.; Seo, Y. B.; Sultan, T.; Lee, O. J.; Lee, J. S.; Yoon, S.; Hong, I.; Khang, G.; Lee, S.; Yoo, J.; Park, C. Precisely Printable and Biocompatible Silk Fibroin Bioink for Digital Light Processing 3D Printing. *Nat. Commun.* Jun. 11, 2018, 9, 1620.
Kirchmajer, D. M.; Gorkin, R.; In Het Panhuis, M. An Overview of the Suitability of Hydrogel-Forming Polymers for Extrusion-Based 3D-Printing. *J. Mater. Chem. B* Apr. 29, 2015, 3 (20), 4105-4117. https://doi.org/10.1039/c5tb00393h.
Klein, F.; Richter, B.; Striebel, T.; Franz, C. M.; Freymann, G. Von; Wegener, M.; Bastmeyer, M. Two-Component Polymer Scaffolds for Controlled Three-Dimensional Cell Culture. *Adv. Mater.* Jan. 14, 2011, 23, 1341-1345. DOI: 10.1002/adma.201004060.
Koblinski, J. E.; Wu, M.; Demeler, B.; Jacob, K.; Kleinman, H. K. Matrix Cell Adhesion Activation by Non-Adhesion Proteins. *J. Cell Sci.* Jul. 5, 2005, 118, 2965-2974.
Lewis, J. A. Direct Ink Writing of 3D Functional Materials. *Adv. Funct. Mater.* Oct. 27, 2006, 16 (17), 2193-2204. https://doi.org/10.1002/adfm.200600434.
Ligon, S. C.; Liska, R.; Stampfl, J.; Gurr, M.; Mulhaupt, R. Polymers for 3D Printing and Customized Additive Manufacturing. *Chem. Rev.* Jul. 30, 2017, 117, 10212-10290.
Lim, K. S.; Schon, B. S.; Mekhileri, N. V.; Brown, G. C. J.; Chia, C. M.; Prabakar, S.; Hooper, G. J.; Woodfield, T. B. F. New Visible-Light Photoinitiating System for Improved Print Fidelity in Gelatin-Based Bioinks. *ACS Biomater. Sci. Eng.* Aug. 1, 2016, 2, 1752-1762.
Lim, K.; Levato, R.; Costa, P.; Castilho, M.; Alcala-Orozco, C.; van Dorenmalen, K.; Melchels, F.; Gawlitta, D.; Hooper, G.; Malda, J.; Woodfield, T. Bio-Resin for High Resolution Lithography-Based Biofabrication of Complex Cell-Laden Constructs. *Biofabrication* May 11, 2018, 10, 034101.
Liu, F.; Chen, Q.; Liu, C.; Ao, Q.; Tian, X.; Fan, J.; Tong, H.; Wang, X. Natural Polymers for Organ 3D Bioprinting. *Polymers (Basel).* Nov. 16, 2018, 10 (11), 1278. https://doi.org/10.3390/polym10111278.
Luo, Y.; Le Fer, G.; Dean, D.; Becker, M. L. 3D Printing of Poly(Propylene Fumarate) Oligomers: Evaluation of Resin Viscosity, Printing Characteristics and Mechanical Properties. *Biomacromolecules* Feb. 26, 2019, 20, 1699-1708.
Ma, X.; Sun, X.; Hargrove, D.; Chen, J.; Song, D.; Dong, Q.; Lu, X.; Fan, T. H.; Fu, Y.; Lei, Y. A Biocompatible and Biodegradable Protein Hydrogel with Green and Red Autofluorescence: Preparation, Characterization and in Vivo Biodegradation Tracking and Modeling. *Sci. Rep.* 2016, 6 (January), 1-12. https://doi.org/10.1038/srep19370.
Mazzoccoli, J. P.; Feke, D. L.; Baskaran, H.; Pintauro, P. N. Mechanical and Cell Viability Properties of Crosslinked Low- and High-Molecular Weight Poly (Ethylene Glycol) Diacrylate Blends. *J. Biomed. Mater. Res.*, Part A May 2009, 93A, 558-566.
Melchels, F. P. W.; Feijen, J.; Grijpma, D. W. A Review on Stereolithography and Its Applications in Biomedical Engineering. *Biomaterials* May 15, 2010, 31, 6121-6130.
Mezger, T. G. The Rheology Handbook, 4th ed.; Vincentz Network: Hanover, Germany, 2014.
Micsonai, A.; Wien, F.; Bulyaki, E.; Kun, J.; Moussong, E.; Lee, Y.-H.; Goto, Y.; Refregiers, M.; Kardos, J. BeStSel: A Web Server for Accurate Protein Secondary Structure Prediction and Fold Recognition from the Circular Dichroism Spectra Andr As. *Nucleic Acids Res.* Jul. 2018, 46, 315-322.
Micsonai, A.; Wien, F.; Kernya, L.; Lee, Y.; Goto, Y.; Réfrégiers, M.; Kardos, J. Accurate Secondary Structure Prediction and Fold Recognition for Circular Dichroism Spectroscopy. *Proc. Natl. Acad. Sci. U. S. A.* Jun. 2, 2015, 112, 3095-3103.
Mondschein, R.; Kanitkar, A.; Williams, C. B.; Verbridge, S. S.; Long, T. E. Polymer Structure-Property Requirements for Stereolithographic 3Dprinting of Soft Tissue Engineering Scaffolds. *Biomaterials* Jun. 6, 2017, 140, 170-188.
Murayama, K.; Tomida, M. Heat-Induced Secondary Structure and Conformation Change of Bovine Serum Albumin Investigated by Fourier Transform Infrared Spectroscopy. *Biochemistry* Sep. 1, 2004, 43, 11526-11532.
Ngo, T. D.; Kashani, A.; Imbalzano, G.; Nguyen, K. T. Q.; Hui, D. Additive Manufacturing (3D Printing): A Review of Materials, Methods, Applications and Challenges. *Composites, Part B* Feb. 13, 2018, 143, 172-196.
Nuttelman, C. R.; Tripodi, M. C.; Anseth, K. S. Synthetic Hydrogel Niches That Promote HMSC Viability. *Matrix Biol.* May 17, 2005, 24, 208-218.

(56) References Cited

OTHER PUBLICATIONS

Palaganas, N. B.; Mangadlao, J. D.; de Leon, A. C. C.; Palaganas, J. O.; Pangilinan, K. D.; Lee, Y. J.; Advincula, R. C. 3D Printing of Photocurable Cellulose Nanocrystal Composite for Fabrication of Complex Architectures via Stereolithography. *ACS Appl. Mater. Interfaces* Sep. 6, 2017, 9, 34314-34324.

Park, T. Y.; Yang, Y. J.; Ha, D.-H.; Cho, D.-W.; Cha, H. J. Marine-Derived Natural Polymer-Based Bioprinting Ink for Biocompatible, Durable, and Controllable 3D Constructs. Biofabrication Apr. 1, 2019. https://doi.org/10.1088/1758-5090/ab0c6f.

Peterson, G. I.; Schwartz, J. J.; Zhang, D.; Weiss, B. M.; Ganter, M. A.; Storti, D. W.; Boydston, A. J. Production of Materials with Spatially-Controlled Cross-Link Density via Vat Photopolymerization. *ACS Appl. Mater. Interfaces* Sep. 29, 2016, 8 (42), 29037-29043. https://doi.org/10.1021/acsami.6b09768.

Poldervaart, M. T.; Goversen, B.; de Ruijter, M.; Abbadessa, A.; Melchels, F. P. W.; Oner, F. C.; Dhert, W. J. A.; Vermonden, T.; Alblas, J. 3D Bioprinting of Methacrylated Hyaluronic Acid (MeHA) Hydrogel with Intrinsic Osteogenicity. *PLoS One* Jun. 6, 2017, 12, No. e0177628.

Raja, S. T. K.; Thiruselvi, T.; Mandal, A. B.; Gnanamani, A. PH and Redox Sensitive Albumin Hydrogel: A Self-Derived Biomaterial. *Sci. Rep.* Nov. 3, 2015, 5, 1-11. https://doi.org/10.1038/srep15977.

Reed, R. G.; Feldhoff, R. C.; Clute, O.; Peters, T. Fragments of Bovine Serum Albumin Produced by Limited Proteolysis. Conformation and Ligand Binding. *Biochemistry* Oct. 1, 1975, 14, 4578-4583.

Saha, A.; Johnston, T. G.; Shafranek, R. T.; Goodman, C. J.; Zalatan, J. G.; Storti, D. W.; Ganter, M. A.; Nelson, A. Additive Manufacturing of Catalytically Active Living Materials. *ACS Appl. Mater. Interfaces* Apr. 2, 2018, 10 (16), 13373-13380. https://doi.org/10.1021/acsami.8b02719.

Schüller-Ravoo, S.; Teixeira, S. M.; Feijen, J.; Grijpma, D. W.; Poot, A. A. Flexible and Elastic Scaffolds for Cartilage Tissue Engineering Prepared by Stereolithography Using Poly(Trimethylene Carbonate)-Based Resins. *Macromol. Biosci.* Nov. 11, 2013, 13, 1711-1719.

Schwartz, J. J.; Boydston, A. J. Multimaterial Actinic Spatial Control 3D and 4D Printing. *Nat. Commun.* Feb. 15, 2019, 10, 791.

Scott, E. A.; Nichols, M. D.; Cordova, L. H.; George, B. J.; Jun, Y. S.; Elbert, D. L. Protein Adsorption and Cell Adhesion on Nanoscale Bioactive Coatings Formed from Poly(Ethylene Glycol) and Albumin Microgels. *Biomaterials* Sep. 3, 2008, 29, 4481-4493. DOI: 10.1016/j.biomaterials.2008.08.003.

Seck, T. M.; Melchels, F. P. W.; Feijen, J.; Grijpma, D. W. Designed Biodegradable Hydrogel Structures Prepared by Stereolithography Using Poly (Ethylene Glycol)/Poly (D, L-Lactide)-Based Resins. *J. Controlled Release* Jul. 24, 2010, 148, 34-41.

Seiler, M. Hyperbranched Polymers: Phase Behavior and New Applications in the Field of Chemical Engineering. *Fluid Phase Equilib.* Feb. 9, 2006, 241, 155-174.

Shafranek, R. T.; Millik, S. C.; Smith, P. T.; Lee, C.; Boydston, A. J.; Nelson, A. Stimuli-Responsive Materials in Additive Manufacturing. *Prog. Polym. Sci.* Mar. 23, 2019, 93, 36-67.

Shirahama, H.; Lee, B. H.; Tan, L. P.; Cho, N. Precise Tuning of Facile One-Pot Gelatin Methacryloyl (GelMA) Synthesis. *Sci. Rep.* Aug. 9, 2016, 6, 31036.

Shirazi, S. F. S.; Gharehkhani, S.; Mehrali, M.; Yarmand, H.; Metselaar, H. S. C.; Adib Kadri, N.; Osman, N. A. A. A Review on Powder-Based Additive Manufacturing for Tissue Engineering: Selective Laser Sintering and Inkjet 3D Printing. *Sci. Technol. Adv. Mater.* May 5, 2015, 16 (3), 033502. https://doi.org/10.1088/1468-6996/16/3/033502.

Smith, P. T. et al. Additive Manufacturing of Bovine Serum Albumin-Based Hydrogels and Bioplastics. *Biomacromolecules.* Nov. 12, 2019, 21, 2, 484-492.

Smith, P. T. et al. Additive Manufacturing of Bovine Serum Albumin-based Hydrogels and Bioplastics. *ChemRxiv.* May 9, 2019.

Stammen J. A.; Williams S.; Ku D. N.; E., G. R. Mechanical Properties of a Novel PVA Hydrogel in Shear and Unconfined Compression. *Biomaterials* Feb. 14, 2001, 22 (8), 799-806.

Sun, X.; Ma, X.; Kumar, C. V.; Lei, Y. Protein-Based Sensitive, Selective and Rapid Fluorescence Detection of Picric Acid in Aqueous Media. *Anal. Methods* Aug. 28, 2014, 6 (21), 8464-8468. https://doi.org/10.1039/c4ay01941e.

Sutton, J. T.; Rajan, K.; Harper, D. P.; Chmely, S. C. Lignin-Containing Photoactive Resins for 3D Printing by Stereolithography. *ACS Appl. Mater. Interfaces* Sep. 26, 2018, 10, 36456-36463.

Tang, Z.; Chen, Q.; Chen, F.; Zhu, L.; Lu, S.; Ren, B.; Zhang, Y.; Yang, J.; Zheng, J. General Principle for Fabricating Natural Globular Protein-Based Double-Network Hydrogels with Integrated Highly Mechanical Properties and Surface Adhesion on Solid Surfaces. *Chem. Mater.* Dec. 6, 2018, 31 (1), 179-189. https://doi.org/10.1021/acs.chemmater.8b03860.

Torres, O. B.; Jalah, R.; Rice, K. C.; Li, F.; Antoline, J. F. G.; Iyer, M.; Jacobson, A.; Boutaghou, M.; Alving, C.; Matyas, G. Characterization and Optimization of Heroin Hapten-BSA Conjugates: Method Development for the Synthesis of Reproducible Hapten-Based Vaccines. *Anal. Bioanal. Chem.* Aug. 2, 2014, 406, 5927-5937.

Ueki, T.; Hiragi, Y.; Kataoka, M.; Inoko, Y.; Amemiya, Y.; Izumi, Y.; Tagawa, H.; Muroga, Y. Aggregation of Bovine Serum Albumin Upon Cleavage of Its Disulfide Bonds, Studied by the Time-Resolved Small-Angle X-Ray Scattering Technique with Synchrotron Radiation. *Biophys. Chem.* Sep. 5, 1985, 23, 115-124.

Voit, B. I.; Lederer, A. Hyperbranched and Highly Branched Polymer Architectures s Synthetic Strategies and Major Characterization Aspects. *Chem. Rev.* Sep. 28, 2009, 109, 5924-5973.

Wallin, T. J.; Pikul, J.; Shepherd, R. F. 3D Printing of Soft Robotic Systems. *Nat. Rev. Mater.* May 4, 2018, 3 (6), 84-100. https://doi.org/10.1038/s41578-018-0002-2.

Wilts, E. M.; Pekkanen, A. M.; White, B. T.; Meenakshisundaram, V.; Aduba, D. C; Williams, C. B.; Long, T. E. Vat Photopolymerization of Charged Monomers: 3D Printing with Supramolecular Interactions. *Polym. Chem.* Feb. 6, 2019, 10, 1442-1451.

Xing, J. F.; Zheng, M. L.; Duan, X. M. Two-Photon Polymerization Microfabrication of Hydrogels: An Advanced 3D Printing Technology for Tissue Engineering and Drug Delivery. *Chem. Soc. Rev.* May 20, 2015, 44 (15), 5031-5039. https://doi.org/10.1039/c5cs00278h.

Xu, B.; Rollo, B.; Stamp, L. A.; Zhang, D.; Fang, X.; Newgreen, D. F.; Chen, Q. Biomaterials Non-Linear Elasticity of Core / Shell Spun PGS / PLLA Fi Bres and Their Effect on Cell Proliferation Q. *Biomaterials* Jun. 6, 2013, 34 (27), 6306-6317. https://doi.org/10.1016/j.biomaterials.2013.05.009.

Zhu, L.; Jiang, J.; Zhu, B.; Xu, Y. Immobilization of Bovine Serum Albumin onto Porous Polyethylene Membranes Using Strongly Attached Polydopamine as a Spacer. *Colloids Surf., B* Mar. 29, 2011, 86, 111-118.

Zhu, W.; Tringale, K. R.; Woller, S. A.; You, S.; Johnson, S.; Shen, H.; Schimelman, J.; Whitney, M.; Steinauer, J.; Xu, W.; Yaksh, T.; Nguyen, Q.; Chen, S. Rapid Continuous 3D Printing of Customizable Peripheral Nerve Guidance Conduits. *Mater. Today* Apr. 27, 2018, 21, 951-959.

\* cited by examiner

5% PEGDA
200 μm

10% PEGDA
200 μm

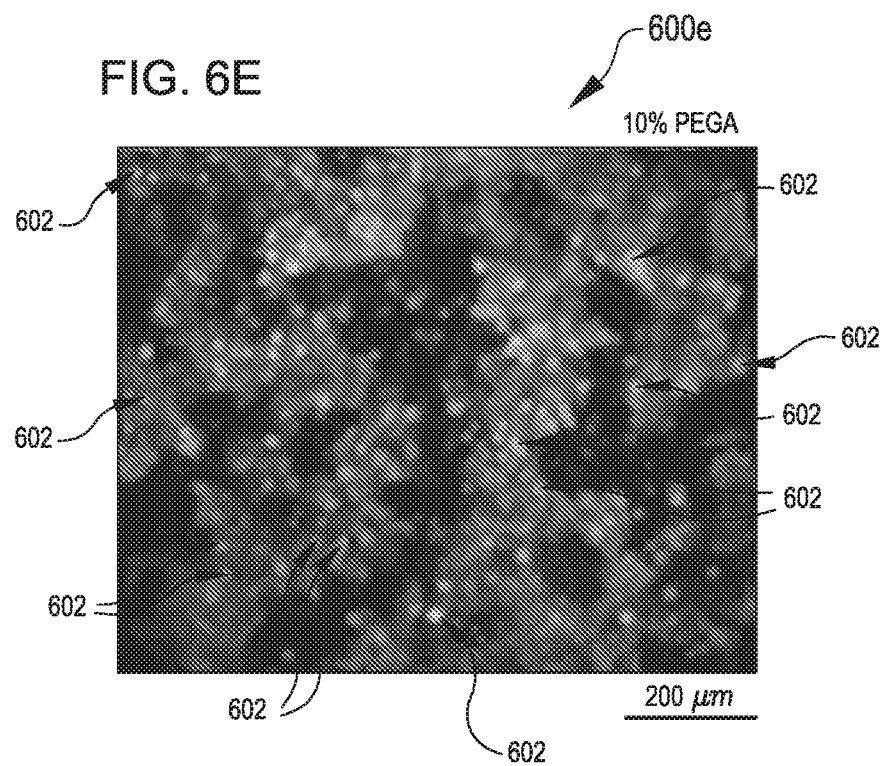

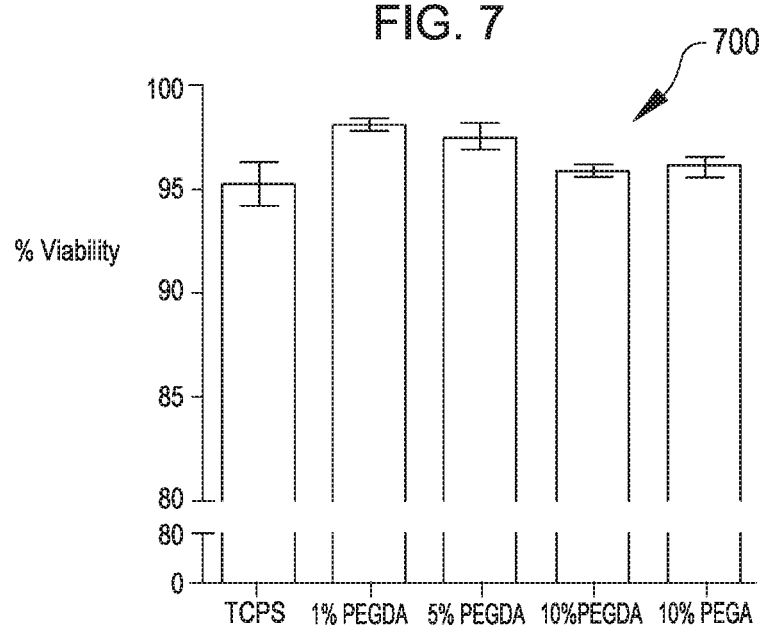
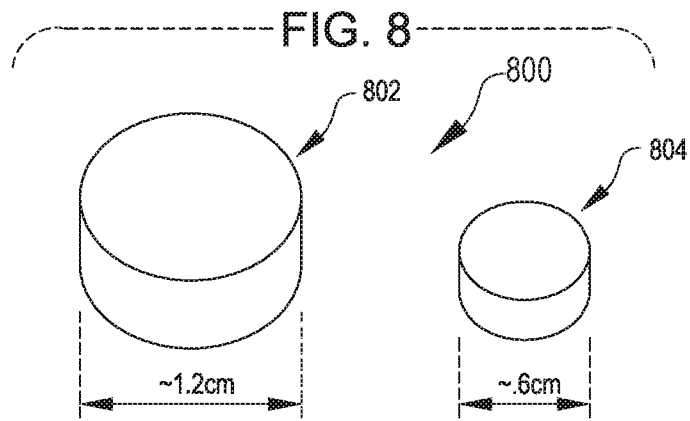

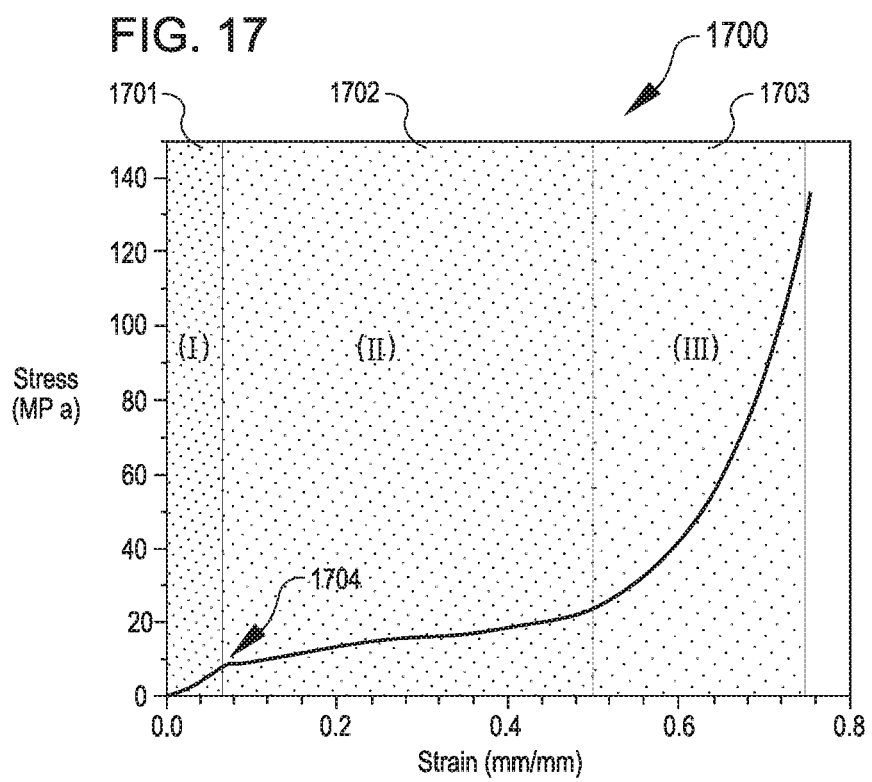

PROTEIN-BASED RESINS FOR ADDITIVE MANUFACTURING

CROSS-REFERENCE TO RELATED APPLICATION

This patent application is the U.S. National Stage of International Application No. PCT/US2020/037947, filed Jun. 16, 2020, which was published in English under PCT Article 21 (2), which in turn claims the benefit of and priority to U.S. Provisional Patent Application Ser. No. 62/863,137, filed Jun. 18, 2019; each of these prior applications is hereby incorporated herein by reference in its entirety for all purposes.

BACKGROUND

Additive manufacturing, commonly known as 3D printing, has drawn tremendous attention as a versatile platform for the on-demand fabrication of functional objects with complex architectures. The advent of 3D printing techniques, including direct write, ink jet printing, and vat photopolymerization, has revolutionized manufacturing. These techniques enable the iterative design of complex shapes without the need for additional tooling, operator expertise, or expensive molds. Stereolithography (SLA) is one type of vat photopolymerization where a laser is scanned to selectively cure a photocurable resin to form a structure. Unlike some other types of 3D printing, SLA provides the ability to achieve micron scale features resulting in high accuracy parts. While capable of producing a structure having high resolution 3D geometry, SLA is greatly limited by the lack of available resins.

Hydrogels include crosslinked hydrophilic polymers and are used in a wide range of 3D printing applications including biomedical implants/drug delivery, tissue engineering/cell scaffolds, and soft robotics. Hydrogels are often used in bio-applications because their high water content mimics an extracellular matrix and provides a suitable microenvironment for cell growth. There are only a few reported resins capable of 3D printing biocompatible hydrogels through vat photopolymerization, including polyethylene glycol diacrylate (PEG-DA), poly(ethylene glycol)-co-poly(propylene fumarate), silk fibroin, and a mixture of methacrylated poly(vinyl alcohol) (PVA-MA) and gelatin-methacryloyl (Gel-MA). Fully synthetic PEG-DA hydrogels typically exhibit poor cell adhesion. PVA-MA and Gel-MA allows for bioprinting with cells within the resin. Synthetic PVA, however, is not biodegradable.

Various biologically derived hydrogels are described in, e.g., Raja et al. (Raja, S. T. K.; Thiruselvi, T.; Mandal, A. B.; Gnanamani, A. PH and Redox Sensitive Albumin Hydrogel: A Self-Derived Biomaterial. Sci. Rep. 2015, 5, 1-11. https://doi.org/10.1038/srep15977), Ma et. al. (Ma, X.; Sun, X.; Hargrove, D.; Chen, J.; Song, D.; Dong, Q.; Lu, X.; Fan, T. H.; Fu, Y.; Lei. Y. A Biocompatible and Biodegradable Protein Hydrogel with Green and Red Autofluorescence: Preparation, Characterization and in Vivo Biodegradation Tracking and Modeling. Sci. Rep. 2016, 6 (January), 1-12. https://doi.org/10.1038/srep19370), which are incorporated herein by reference in their entirety for all purposes. However, these hydrogels have not been previously demonstrated in a 3D printing process.

General requirements for polymer structures for 3D printing are described by Ryan et. al., (Ryan J. Mondschein, Akanksha Kanitkar, Christopher B. Williamsb, Scott S. Verbridge, T. E. L. Polymer Structure-Property Requirements for Stereolithographic 3D printing of Soft Tissue Engineering Scaffolds. Biomaterials 2017, 140, 170-188.), by Schuller-Ravoo et. al., (Schiller-Ravoo, S.; Teixeira, S. M.; Feijen, J.; Grijpma. D. W.; Poot, A. A. Flexible and Elastic Scaffolds for Cartilage Tissue Engineering Prepared by Stereolithography Using Poly(Trimethylene Carbonate)-Based Resins. Macromol. Biosci. 2013, 13 (12), 1711-1719, https://doi.org/10.1002/mabi.201300399), and in Lim et. al. (Lim, K. S.; Schon, B. S.; Mekhileri, N. V.; Brown, G. C. J.; Chia, C. M.; Prabakar, S.; Hooper, G. J.; Woodfield, T. B. F. New Visible-Light Photoinitiating System for Improved Print Fidelity in Gelatin-Based Bioinks. ACS Biomater. Sci. Eng. 2016, 2 (10), 1752-1762. https://doi.org/10.1021/acsbiomaterials.6b00149), which are hereby incorporated herein by reference in their entirety for all purposes.

The use of biodegradable hydrogels in resin for SLA printing using PEG-PPF copolymers has been demonstrated in Dilla et. al., which is hereby incorporated herein by reference in its entirety for all purposes. Dilla. R. A.; Motta. C. M. A.; Snyder. S. R.; Wilson, J. A.; Wesdemiotis, C.; Becker, M. L. Synthesis and 3D Printing of PEG-Poly (Propylene Fumarate) Diblock and Triblock Copolymer Hydrogels. ACS Macro Lett. 2018, 7 (10), 1254-1260. https://doi.org/10.1021/acsmacrolett.8b00720. Although the system of Dilla doesn't require the diluent DEF that is typically required for SLA printing PPF, it does however require many synthetic steps to prepare the triblock copolymer used in the resin. To this end, new materials specifically for SLA that are biocompatible, biodegradable, and simpler to prepare, are of interest.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to various embodiments of the present disclosure, a method of preparing a biocompatible structure can include preparing a photopolymerizable protein resin, and printing the resin into a structure by patterned application of light in an effective wavelength. The photopolymerizable protein resin can be prepared by combining an aqueous solution of a water soluble acrylated or methacrylated protein with a photoreactive comonomer. According to various embodiments, the photoreactive comonomer can be a photoinitiator, which may also be added with a photosensitizer and/or a photocatalyst. The photopolymerizable protein resin may also be prepared by the addition of a water soluble acrylated or methacrylated comonomer.

According to various embodiments of the present disclosure, a biocompoatible 3D-printed bioplastic structure can be formed using any of the embodiments of photopolymerizable protein resin disclosed herein by applying light in an effective wavelength to the resin to stiffen the resin into a crosslinked hydrogel structure. In some embodiments, the crosslinked hydrogel structure is photocured to achieve additional stiffness and strength, and can be heat-treated to transition the hydrogel structure into a bioplastic structure. Embodiments of 3D-printed bioplastic structures as disclosed herein can be biocompatible, bioabsorbable, or enzymatically degradable. According to various embodiments, 3D-printed bioplastic structures (as well as hydrogel structures) can have complex geometries, including internal geometries, such as lattices, voids, lumens, etc., that are not restricted by conventional manufacturing limitations, e.g., the limitations of molding or of subtractive forming techniques.

BRIEF DESCRIPTION OF THE DRAWINGS

FIG. 6A-6E are fluorescent confocal microscope images showing BSA-based hydrogels with representative live/dead staining of fibroblasts on tissue culture polystyrene (TCPS) and on composite hydrogels with varying PEG-DA and PEG-A content.

FIG. 7 is a graphical representation showing approximate percentages of viable cells on the hydrogels of FIGS. 6A-6E in culture over a 21-day culture period.

FIG. 8 is an image showing a printed compression disk at equilibrium swelling and in a dehydrated state.

FIG. 17 shows a representative compressive stress versus strain curve for a dehydrated sample of 30 wt % MA-BSA.

DETAILED DESCRIPTION

In the following description, various embodiments of the present invention will be described. For purposes of explanation, specific configurations and details are set forth in order to provide a thorough understanding of the embodiments. However, it will also be apparent to one skilled in the art that the present invention may be practiced without the specific details. Furthermore, well-known features may be omitted or simplified in order not to obscure the embodiment being described.

Various embodiments disclosed herein include protein-based resins for stereolithographic (SLA) 3D printing, a one-step process for functionalization of suitable proteins to develop the biodegradable hydrogel resin, and biodegradable 3D-printed structures formed by the application of SLA to the biodegradable hydrogel resin. Various water-soluble globular proteins are compatible with the methods described herein. One suitable globular protein is Bovine Serum Albumin (BSA), which has been demonstrated to form hydrogel networks through either redox chemistry, thermal denaturation, or glutaraldehyde crosslinking. However, these strategies have been previously limited to molding processes and were not believed to be compatible with any 3D printing methods. Various specific embodiments disclosed herein include bovine serum albumin (BSA)-based resins for SLA 3D printing.

A printable proteinacious resin can include a water soluble comonomer to accelerate the rate of the polymerization during the printing process, enabling fabrication of complex 3D structures with feature resolution that is comparable to optimized commercial SLA resin despite being biocompatible and, in some embodiments, biodegradable or bioabsorbable. In addition, the mechanical properties of the printed structures can be tuned by the type and amount of comonomer or by a thermal post-processing step. The attractive features of a globular protein resin (e.g. a BSA-based resin) are its simple synthesis, biocompatibility, inherently low intrinsic viscosity, and biodegradability which enable the resin to be useful for a range of applications including drug delivery, tissue engineering, and anatomical modeling. Taking BSA as an example, BSA's excellent biocompatibility, biodegradability and low immune response enable its use as a biomaterial, bioabsorbable implant or surgical device, clamp or suture, scaffold, or other biomedical support structure.

Figure 1:
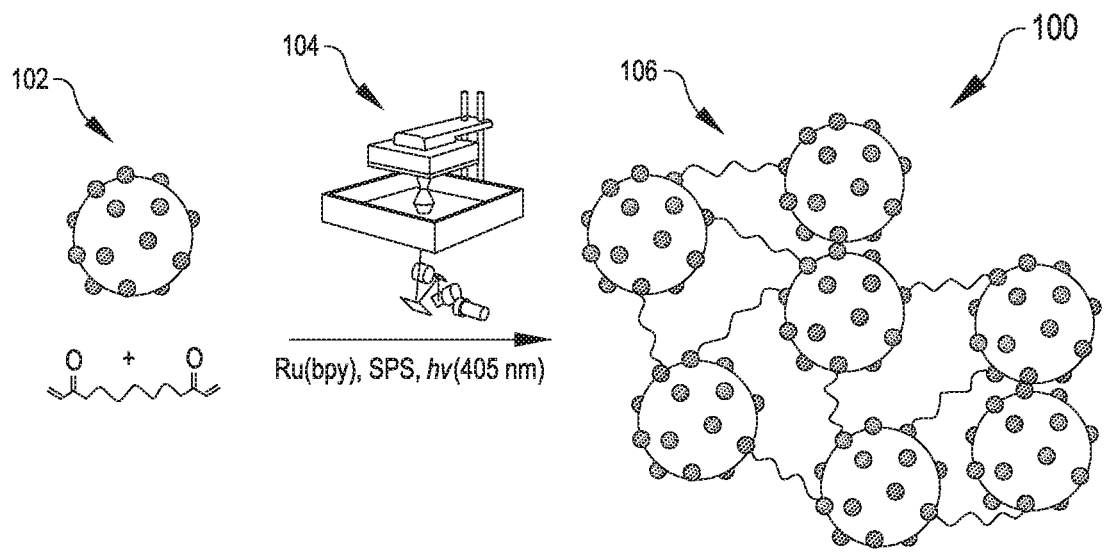
FIG. 1 shows a representation of methacrylated bovine serum albumin (BSA-MA) resin formation and 3D printing process.

FIG. 1 illustrates a simplified process 100 for forming a cross-linked hydrogel structure, in which a biocompatible globular protein (e.g., BSA) 102 is processed by functionalizing with an acrylated or methacrylated comonober and combining with a photoreactive comonomer or a photoinitiator, resulting in a photo-curable proteinaceous resin. This proteinacious resin can be partially photo-cured in printing 104, e.g. by sequentially exposing the photopolymerizable protein resin to irradiation in a patternwise manner one or more times. According to some embodiments, this sequential exposure is performed in planar layers of resin, and the printing plane is moved relative to the printed layers so that the layers accumulate to form a 3D structure. In some embodiments, the printed structure can be subsequently removed and photo-cured 106, resulting in a substantially stiffened and water insoluble cross-linked hydrogel structure made of biocompatible protein. Further heat-treatment can be used to stiffen the cross-linked hydrogel structure into a robust bioplastic having mechanical properties comparable to PLA. Methods described herein can provide for resins that can be printed into biocompatible and biodegradable 3D architectures with excellent resolution (e.g., 1-500 µm). Resolutions for printing can be highly variable, as the resolution tends to be application specific, but in some embodiments, resolutions can in a range of 1-10 µm, or higher (less than 1 µm). Specific embodiments utilize photo-crosslinkable BSA-methacrylate (BSA-MA), comonomers, and photoinitiator. The incorporation of comonomer results in printable materials and tunable mechanical properties. This strategy has shown to be biocompatible with fibroblasts and undergoes enzymatic degradation. Suitable water soluble acrylated and methacrylated comonomers include, but are not limited to: Hydroxyethyl acrylate (HEA), N-isopropyl acrylamide (NIPAM), poly(ethylene glycol) acrylate (PEG-A), hydroxyethyl methacrylate (HEMA), acrylamide, and dimethylaminoethyl methacrylate (DMAEMA). Suitable photoinitiators include photosensitizers or photoradical generators including, but not limited to: Ru(bpy), and lithium phenyl 2,4,6-trimethyl benzoyl phosphate. In some embodiments, the photo-curable proteineous resin can include an additional radical generator, such as but not limited to sodium persulfate (SPS) or ammonium persulfate (APS).

BSA is one example of a class of globular proteins with surface lysines and high aqueous solubility that includes proteins such as whey, lactalbumin, and other serum albumins. BSA in particular is a ubiquitous protein in cell culture protocols and various biological assays because of its low cost, stability, and solubility in water. However, the methods of functionalizing BSA for generating SLA resin can be transferred to other globular proteins. Except where contraindicated below, methods and structures described herein as applied to BSA are generally compatible with water-soluble globular proteins with surface lysines. According to various embodiments, the cross-linked hydrogel structures described herein are formed by functionalizing any suitable water-soluble globular protein to form a proteinacious resin according to the techniques described herein. According to various specific embodiments, hydrogel structures described herein are formed by functionalizing one of whey, lactalbumin, or any suitable serum albumin. According to some specific embodiments, hydrogel structure described herein are formed by functionalizing BSA.

In accordance with various embodiments of the present disclosure, the globular protein (e.g., BSA) in aqueous solution retains a relatively low viscosity at high concentrations. e.g., less than 10 Pa·s, preferably less than 5 Pa·s, preferably less than 1 Pa·s, at concentrations greater than 15% by mass. According to some embodiments, the viscosity of the methacrylated protein remains less than 10 Pa·s, preferably less than 1 Pa·s, even at aqueous concentrations greater than 15%, greater than 20%, greater than 30%, or between 30 and 35% (by mass). The low viscosity of the protcinaceous solution remains when the proteinaccous solution is modified to form a photo-curable proteinaceous resin. Low viscosity of the photo-curable proteinaceous resin allows the resin to settle during printing, i.e. between layers, increasing the speed at which printing can take place and the level of fine detail that can be captured. This resin property enables the fabrication of objects where the main structural component is the natural polymer (e.g., BSA, or other suitable globubular protein) so that the entire object can be formed of the same natural polymer.

Specific printable photo-curable resins include, but are not limited to, the following:
  30 wt % BSA-MA, 10 wt % PEG-DA, 0.0748 wt % Ru, 0.238 wt % SPS, water
  30 wt % BSA-MA, 5 wt % PEG-DA, 0.0748 wt % Ru. 0.238 wt % SPS, water
  30 wt % BSA-MA, 10 wt % PEG-A, 0.0748 wt % Ru, 0.238 wt % SPS, water
  30 wt % BSA-MA, 5 wt % PEG-A, 0.0748 wt % Ru, 0.238 wt % SPS, water
  30 wt % BSA-MA, 10 wt % nipam, 0.4 wt % LAP, water
  30 wt % BSA-MA, 10 wt % PEG-DA, 0.4 wt % LAP, water Materials and Methods for Generating Photocurable Proteinaccous Resin:

Materials: All materials were purchased from Sigma Aldrich (MilliporeSigma, St. Louis. Missouri United States) unless otherwise stated. Methacrylic anhydride (94%), Tris (2,2'-bipyridyl)dichlororuthenium(II) hexahydrate (Ru (bpy)) (99.95%), poly(ethylene glycol) diacrylate ($M_n$ 700 Da), poly(ethylene glycol) methyl ether acrylate ($M_n$ 480 Da) and sodium persulfate (SPS) were used as received. BSA was purchased from Nova Biologics Inc., Oceanside, California, USA.

Methacrylatsion of BSA: To a 500 mL round-bottom flask equipped with a magnetic stir bar, inlet adapter and condenser was added BSA (20 g, x mol) and $NaHCO_3/Na_2CO_3$ buffer (200 mL, 0.25 M, pH 9.0). The solution was stirred at 22° C. until BSA dissolved. Then, methacrylic anhydride (4 mL, 0.0270 mol, 2.5 eq. per lysine residue) was added dropwise to the dissolved BSA solution over 10 minutes. The reaction mixture was stirred at 22° C. for 1 hour. The crude product was diluted and dialyzed against deionized (DI) water for 48 hours. After lyophilization, the product was isolated as a white powder of BSA-methacrylate (BSA-MA, 18.3 g, 91.5% yield).

TNBS assay: To determine the percent functionalization, 2,4,6-Trinitrobenzene Sulfonate (TNBS) assay was performed. BSA and BSA-MA were dissolved in CB buffer at a concentration of 20 µg/mL. 0.25 mL of 0.01% (w/v) solution of TNBS was added to 0.5 mL of each protein solution. The samples were incubated at 37° C. for 2 hours. To quench the reaction, 0.25 mL of 10% SDS and 0.125 mL of 1N HCl were added to each sample. The absorbance of each solution was measured at 335 nm.

Preparation of BSA-MA based resin: All resin formulations were prepared in amber bottles and covered in aluminum foil to prevent unwanted polymerization. The weight percentages are based on the total composition of the resin, including the aqueous solvent. To prepare resin with 30 wt % BSA-MA and 5 wt % PEG-DA, 0.3 g of PEG-DA was dissolved in 3.66 mL of deionized (DI) water. 1.8 g of BSA-MA was then slowly added to this solution with gentle mixing until dissolved. Next, 120 µL of 1 mM Ru(bpy) solution then 120 µL of 10 mM SPS were dissolved into the resin formulation. The final resin formulation was covered in aluminum foil and stored at 4° C. until use. To prepare other formulations, the same preparation was followed, changing only the comonomer and DI water quantities.

Fabrication of BSA-MA hydrogels using SLA printing: A FORMLABS Form 2 printer (Formlabs, Inc., Somerville, Massachusetts, United States) was used to fabricate the hydrogel structures. The build plate and resin tray were lightly modified to reduce the total volume of resin required to print. The build plate was cut down to 45 mm×45 mm and a 48 mm×78 mm×28 mm border was 3D printed on a FLASHFORGE Creator Pro and glued to the resin tray to form a small reservoir within the standard resin tray.

3D structures were designed with AUTODESK Fusion 360 or downloaded from THINGIVERSE. The resin was poured within the border and ice was placed around the outside of the border to prevent the temperature of the resin from increasing during the print. Hydrogel structures were then printed in 'Open mode' with a layer height of 50 µm. Upon completion of the print, samples were removed from the build plate, gently swirled in DI water to remove any uncured resin, and post cured in a custom photo-curing chamber (400 nm, 20 W) for 90 minutes.

Samples that underwent the heat treatment step were air dried after the photo-curing step and placed in the 120° C. oven for 180 minutes.

Swelling experiment 3D printed disks (10 mm×5 mm) were used for mass loss and swelling experiments. After printing and post-photo curing, the disks were lyophilized to obtain the initial dry weight ($m_{dry,i}$). Samples were then submerged in an excess of DI water and weighed after 1 day ($m_{swollen}$). The swollen samples were then freeze-dried and weighed again ($m_{dry}$). The swelling ratio (q) and mass loss were calculated as follows:

$$\% \text{ mass loss} = \left(\frac{m_{dry,i} - m_{dry}}{m_{dry,i}}\right) \times 100\% \quad \text{Equation (1)}$$

$$q = \frac{m_{swollen}}{m_{dry}}$$

Rheological characterization. Rheological characterization was performed on a TA Instruments Discovery Hybrid Rheomter-2. Viscosity versus shear rate experiments were performed at a shear rate increasing from 1-100 s$^{-1}$ using a 40 mm cone and plate geometry with a cone angle of 1.019°, a solvent trap, and a gap height of 26 µm. Due to surface tension effects, only the range from 6-100 Pa·s was reported. To conduct photo-rheology experiments, the rheometer was outfitted with a collimated light source ($\lambda$=400 nm, 10 mW cm$^{-2}$) (Thorlabs, Inc., Newton, New Jersey, United States) that was turned on 60 seconds after the start of the experiment. Using a 20 mm parallel plate and a gap height of 1000 µm, the storage and loss moduli were monitored for a total of 150 seconds at 1% strain and 1 Hz.

Compression testing. Compression testing was performed using an INSTRON 5585H load frame with a 2 kN load cell (Instron, Inc., Norwood, Massachusetts, United States). Cylindrical compression samples (10 mm×5 mm) were 3D printed as described above. All samples were tested at equilibrium swelling with DI water. Heat treated samples were air dried after photo-curing, placed in a 120° C. oven for 180 minutes, then rehydrated in DI water to equilibrium swelling. All tests were conducted using a crosshead rate of 0.5 mm/min until specimen failure. Prior to testing, the samples were removed from the DI water and blotted dry with a Kim wipe. Then, the dimensions of each specimen were measured with calipers. At least 3 specimens of each formulation were tested. The modulus, compressive strength, and toughness were determined from the resulting stress-strain curve. The stress strain curves were differentiated using MATLAB software to produce the tangent modulus vs strain curves (Mathworks, Inc., Natick, Massachusetts, United States). The toughness was determined by calculating the area under the stress-strain curves.

Scanning electron microscopy. Scanning electron microscopy (SEM) samples were air dried after printing and imaged using an Apreo-S SEM (Thermo Fisher Scientific, Inc., Waltham, Massachusetts, United States).

Cell culture and biocompatibility assessment: Thin films of hydrogels 1 mm thick and 5 mm in diameter were inserted into wells of a standard 96-well culture plate. NIH/3T3 murine fibroblasts (ATCC, Virginia, United States) were then seeded onto these thin films at a density of 1×10$^5$ cells/cm$^2$ and cultured in high-glucose DMEM (Invitrogen. Inc, Massachusetts, United States) supplemented with 10% fetal bovine serum and 1% penicillin-streptomycin (Invitrogen). Cultures were maintained for 21 days before cells were stained with a live/dead viability kit (Invitrogen) following the protocol provided by the manufacturer. Stained samples were then imaged using a widefield fluorescent microscope (A1R, Nikon Instruments, Melville, New York, United States) at 20× magnification. Live cells appeared as green (calcein-AM excitation/emission: 488/515 nm), while dead cells appeared as red (ethidium homodimer-1 excitation/emission: 570/602 nm). Quantification of images was conducted using ImageJ image processing software (National Institutes of Health, Maryland, United States).

Results and Discussion

Figure 2:
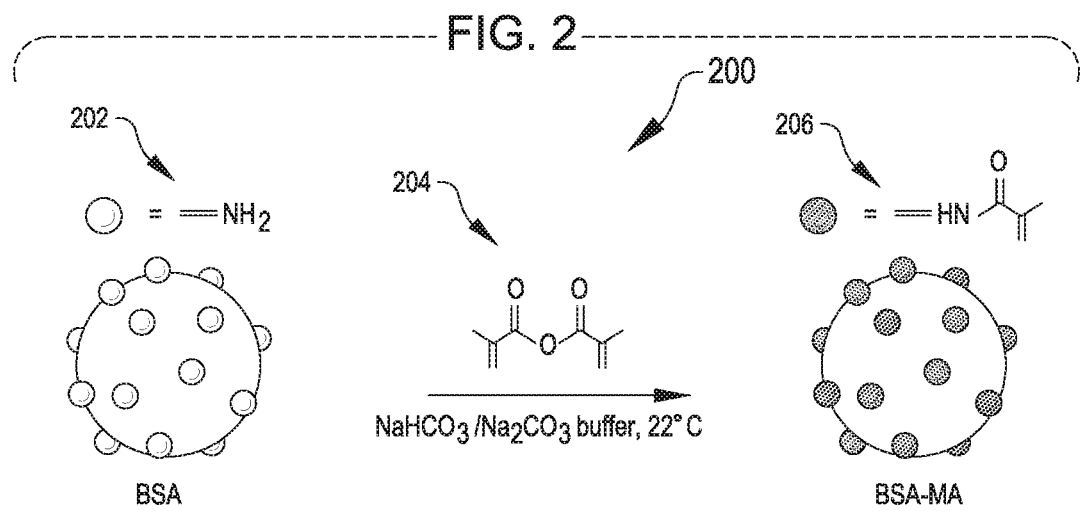
FIG. 2 illustrates an example process for the methacrylation of bovine serum albumin (BSA).

Methacrylation of BSA: The synthesis of BSA-MA is graphically illustrated in FIG. 2, which shows a process 200 whereby BSA 202 is functionalized by combination water soluble acrylated or methacrylated comonomers and a photoinitiator 204 (i.e., a photosensitizer or photoradical generator) to form a biocompatible and water-soluble photocurable proteinacous resin BSA-MA 206. The TNBS assay results suggest that 95% of the lysine residues were functionalized by the methacrylic anhydride.

Figure 3A:
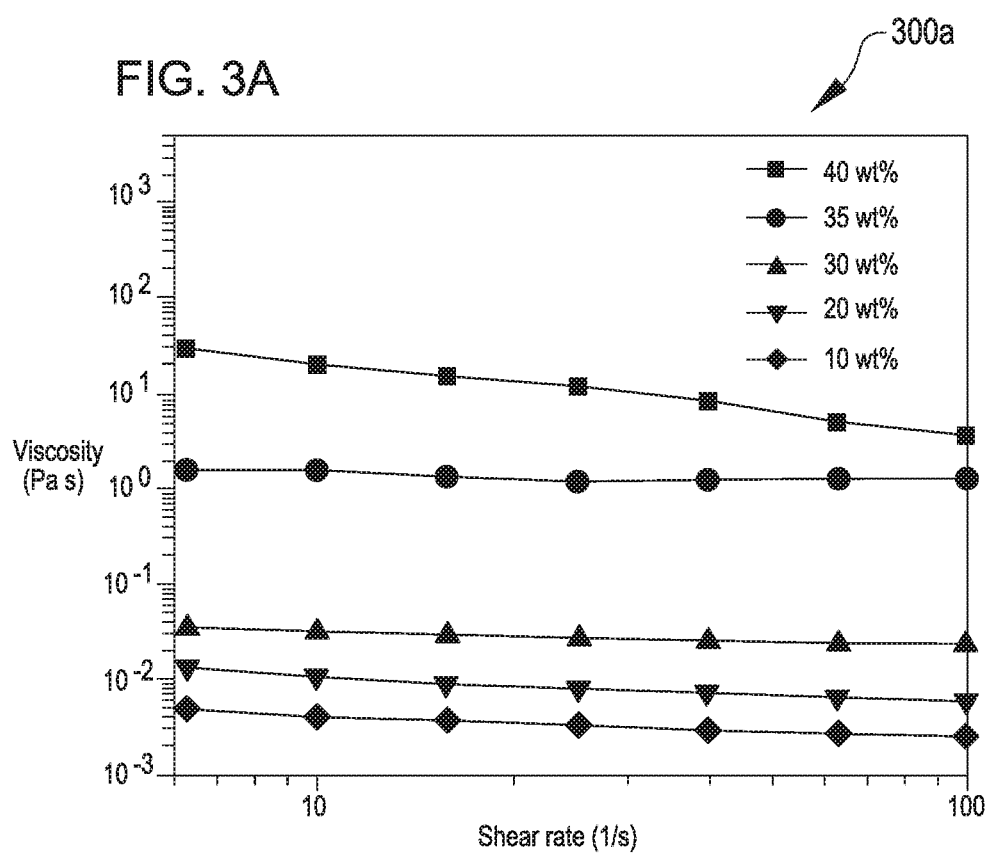
FIG. 3A is a graphical representation of viscosity as a function of shear rate for 10-40 wt % BSA-MA formulations.

Resin formulation: The resin formulation was investigated to have appropriate viscosity and fast polymerization rate for SLA. High viscosity resins do not rapidly self-level which inhibits the recoating step between layers. Therefore, a printable resin must have viscosity below 10 Pa·s. Initially, the viscosity of resin formulations was examined using a DHR-2 rheometer over the range of 10-40 wt % BSA-MA in water (FIG. 3A). FIG. 3A shows a graphical representation 300a of viscosity of the various resin formulations as a function of shear rate. Formulations with 30 wt % BSA-MA or less had viscosities less than 0.0348 Pa·s, while the viscosity increased to 1.56 Pa·s and 29.4 Pa·s for 35 wt % and 40 wt % BSA-MA respectively. The viscosity increases with increasing BSA-MA concentration due to increased polymer chain and molecular interactions. These results suggest that 30 wt % BSA-MA has appropriate viscosity for SLA while maintaining high BSA-MA content in the formulation.

Figure 3B:
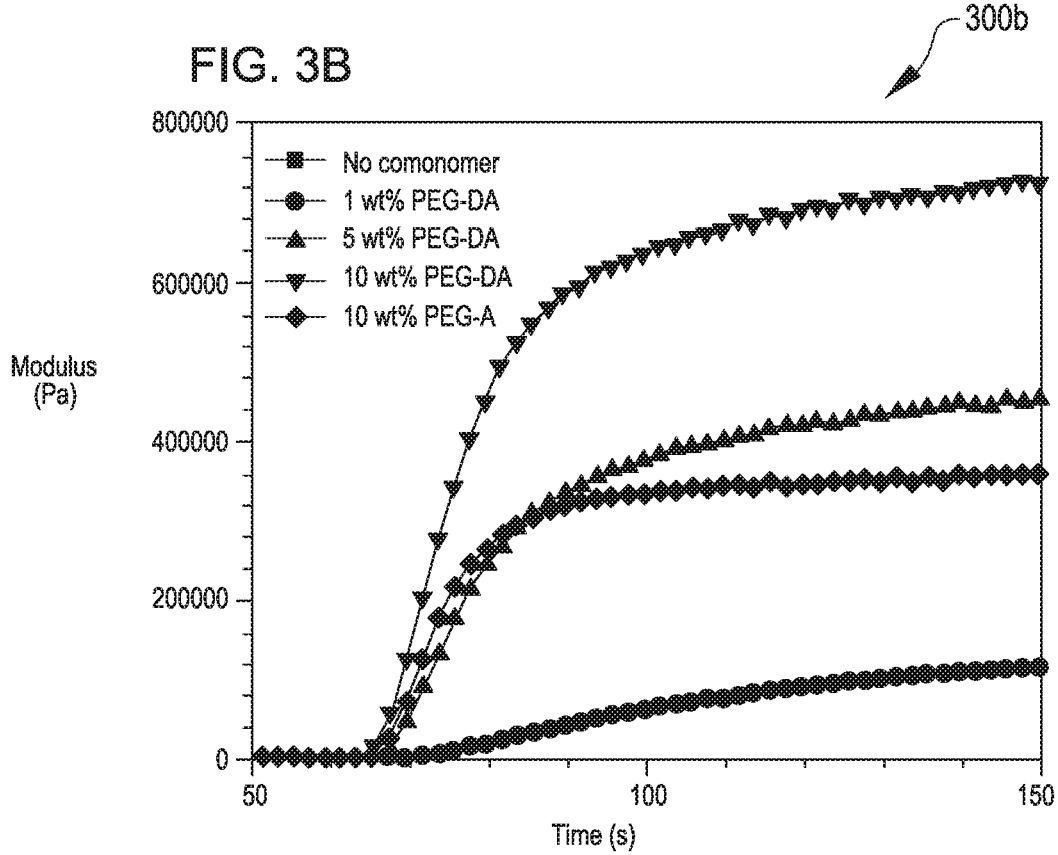
FIG. 3B is a graphical representation showing photorheology of BSA-MA resin with various amounts of comonomer, responsive to activation of a 400 nm light source at 60 s.

Another important factor for SLA is the rate of the polymerization. The dwell time and intensity for the Form 2's laser are not tunable, so the cure rate of the resin must be tailored to be compatible with the printer. The cure rate of BSA-MA formulations was investigated by photo-rheology and compared to the commercial clear resin, as shown in FIG. 3B. FIG. 3B shows a graphical representation 300b of resin modulus over time, responsive to exposure to light (405 nm) beginning at 60 s. Ru(bpy) coupled with SPS was used as a photo-initiator system for SLA due to their solubility in water and high molar extinction coefficient at 405 nm. We found that 10-30 wt % of BSA-MA with 0.0748 wt % Ru(bpy) and 0.238 wt % sodium persulfate formulations do not cure quickly enough to enable SLA printing. This is likely due to the steric hindrance of BSA molecule (66 kDA) resulting in inefficient crosslinking process. From these experiments, we hypothesized that addition of photo-crosslinkable small monomers may increase the cure rate. Photo-rheology using a 400 nm light source was performed. Poly(ethylene glycol) diacrylate (PEG-DA, $M_n$ 700 Da) and poly(ethylene glycol) methyl ether acrylate (PEG-A, $M_n$ 480 Da) were added to the formulation. Addition of 1 wt % PEG-DA did not speed up the polymerization enough, while 5 and 10 wt % PEG-DA significantly accelerated the polymerization. Monofunctional monomer, PEG-A, was also shown to increase the polymerization rate. The storage modulus of the formulation without any comonomer increased at a rate of 0.9 Pa/s while the incorporation of monomer increased the cure rate by orders of magnitude (hundreds of Pa/s for 1 wt % and thousands of Pa/s for 5 and 10 wt % added comonomer). It should be noted that the addition of comonomer does not affect the viscosity of the resin.

Figure 4A:
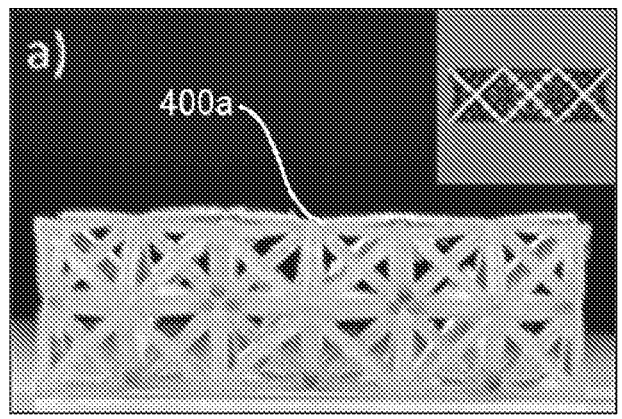
FIGS. 4A-4C are optical images of lattice structures, scale bar of 5 mm.
Figure 4B:
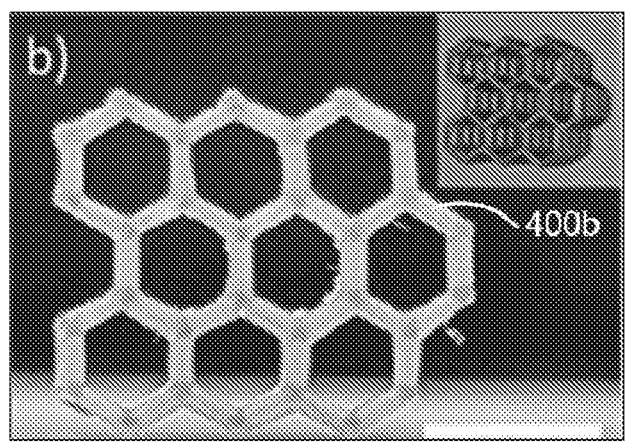
Figure 4C:
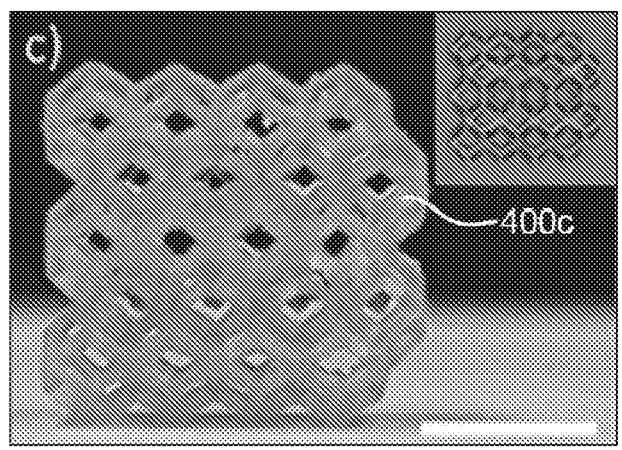
Figure 4D:
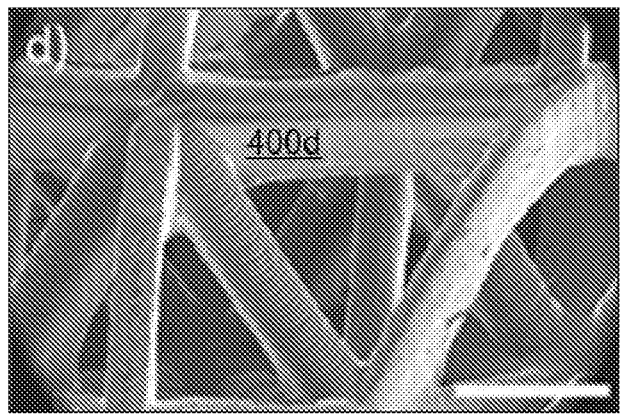
FIGS. 4D-4F are SEM images of the lattice structures of FIGS. 4A-4C, respectively, with a scale bar of 1 mm.
Figure 4E:
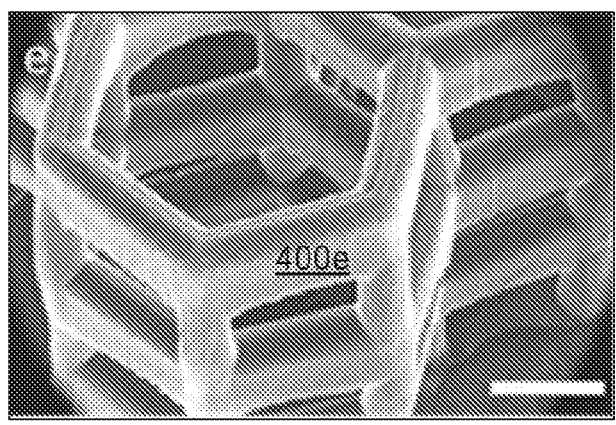
Figure 4F:
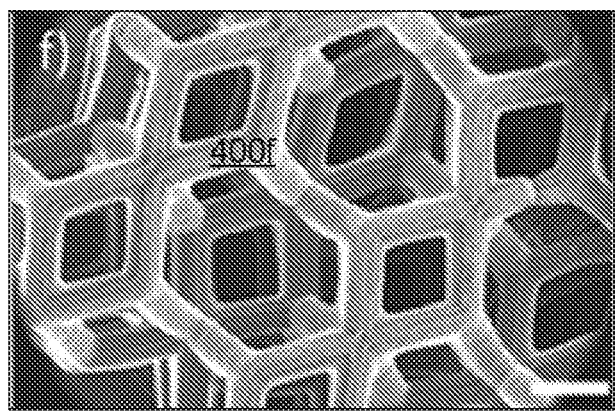

SLA printing: The results from photo-rheology experiments suggest that comonomer is necessary for the formulation in this system. The resin formulation with 1 wt % comonomer (30 wt % BSA-MA, 1 wt % PEG-DA, 0.0748 wt % Ru(bpy), 0.238 wt % SPS) was only able to print the initial 10-20 layers. The following layers suffered from delamination and remained within the resin tray rather than adhered to the printed structure. This result suggests that the rate of the polymerization is a key parameter for SLA printing. Given the improved rate of the polymerization with 5-10 wt % of comonomer, these resin formulations (30 wt % BSA-MA, 5-10 wt % PEG-DA, 0.0748 wt % Ru(bpy), 0.238 wt % SPS) were able to successfully print complex three-dimensional structures. To demonstrate the print resolution of this system, lattice structures were printed from CAD models, as shown in FIGS. 4A-4F. FIGS. 4A-4C show printed lattice structures at a first resolution (5 mm scale bar), and FIGS. 4D-4F show SEM images of the printed lattice structures (1 mm scale bar).

FIG. 4A is a microscope image illustrating a sub-mm-scale dense triangular lattice structure 400a; FIG. 4B is a microscope image illustrating a sub-mm-scale dense hexagonal latice structure 400b; and FIG. 4C is a microscope image illustrating a sub-mm-scale dense cubic lattice structure 400c. FIGS. 4A-4C illustrate the high complexity of structures that can be printed using the proteinaceous resins disclosed herein. FIGS. 4D-4F are SEM images corresponding to the above structures and illustrating the fine detail and resolution of printing, e.g., FIG. 4D is an SEM image 400d of the dense triangular lattice 400a; FIG. 4E is an SEM image 400e showing the hexagonal lattice 400b; and FIG. 4F is an SEM image 400f showing the cubic lattice 400c. The struts shown in FIGS. 4D-4F are well resolved (lengths averaging 250 μm in FIG. 4F). Additionally, the layer heights are clearly visible when angled structures are printed due to the stacked layers being offset from each other (heights averaging about 50 μm in FIG. 4D).

Figure 5A:
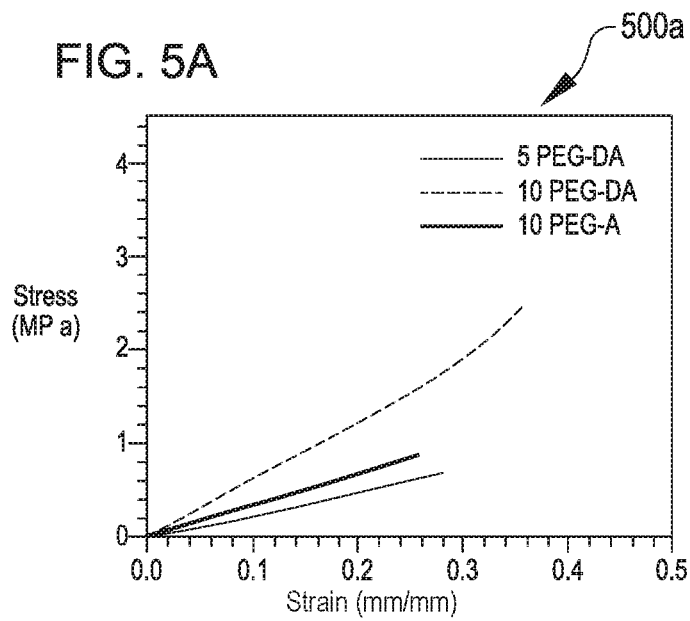
FIG. 5A is a graphical representation showing stress-strain curves for formulations with various amounts of comonomer tested at equilibrium swelling.
Figure 5B:
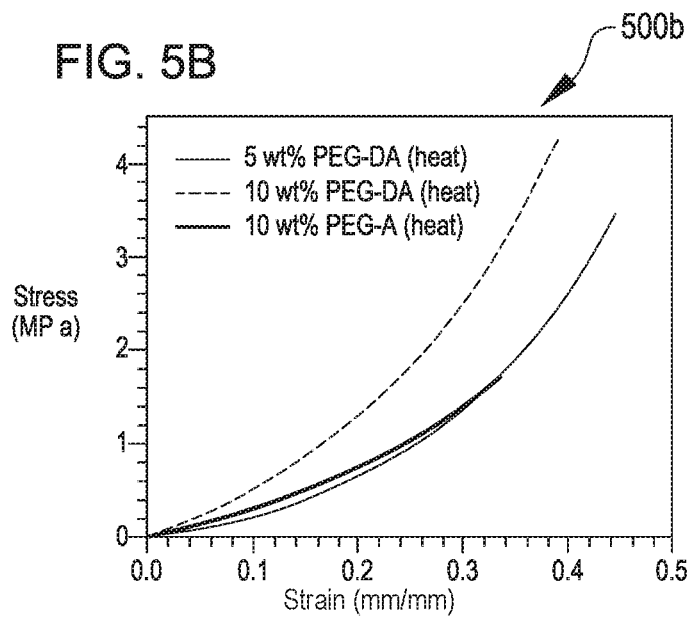
FIG. 5B is a graphical representation showing stress-strain curves for various formulations at equilibrium swelling after heat treatment.

Mechanical properties: Uniaxial compression tests were performed to characterize the mechanical properties of cured hydrogel specimens and the corresponding dried bioplastics. The compressive stress-strain curves are plotted in FIGS. 5A and 5B. FIG. 5A illustrates a series of stress-strain curves 500a illustrating the mechanical properties of 5 wt % PEG-DA, 10 wt % PEG-DA, and 10 wt % PEG-A cured hydrogel specimens before heat treatment; and FIG. 5B illustrates a series of stress-strain curves 500b illustrating the mechanical properties of 5 wt % PEG-DA, 10 wt % PEG-DA, and 10 wt % PEG-A cured hydrogel specimens after heat treatment. Monofunctional PEG-A was used to test our ability to tune the Young's modulus by using different comonomers. The samples with 10 wt % PEG-A had a lower Young's modulus than samples with 10 wt % PEG-DA; 3.2 MPa and 5.1 MPa respectively. This is because PEG-A forms a linear polymer that is crosslinked by the BSA-MA molecules, while PEG-DA can crosslink with BSA-MA as well as other PEG-DA molecules. Samples that were heat-treated exhibited markedly different stress-strain curves than un-treated samples, as shown by the contrast between curves 500a and 500b. The compressive strength of the heat-treated samples increased by over 500%, 175%, and 200% compared to non-heated samples for 5 wt % PEG-DA, 10 wt % PEG-DA and 10 wt % PEG-A incorporation, respectively. This increase in compressive strength is likely due to the formation of intermolecular β-sheets from BSA thermal denaturation above 70° C. The results suggest that the intermolecular β-sheets may form additional crosslinks and increase the strength of the network. The presence of additional crosslinking sites is corroborated by the decreased swelling ratio of the heat-treated samples.

Figure 5C:
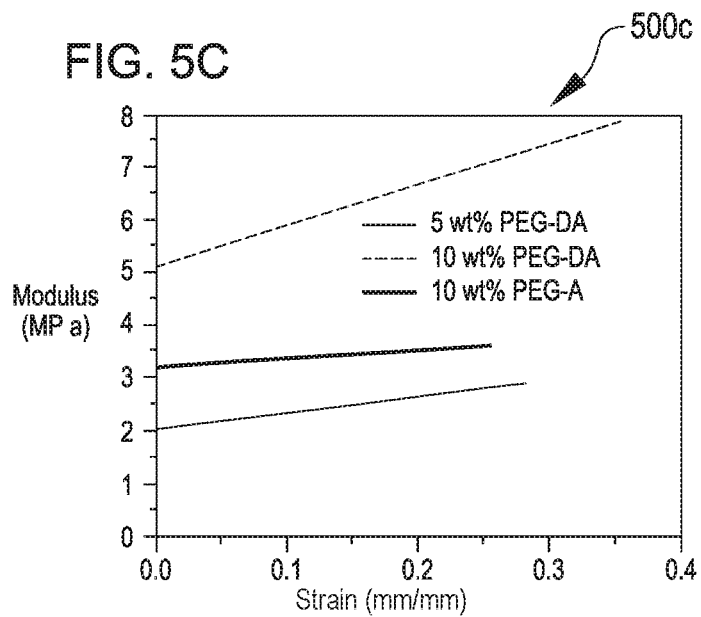
FIG. 5C is a graphical representation showing stiffness vs strain curves for various formulations.
Figure 5D:
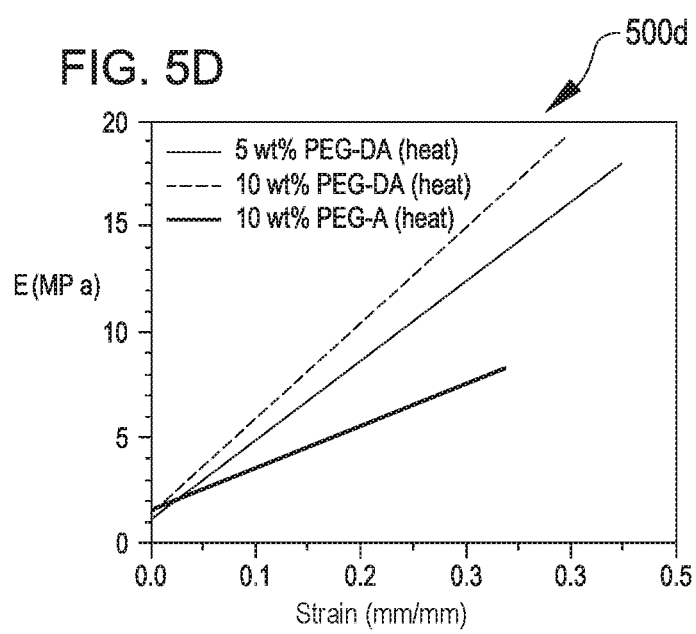
FIG. 5D is a graphical representation showing stiffness vs strain curves for various formulations after heat treatment.

Interestingly, the heat-treated samples also demonstrated a non-linear elastic behavior. The stress-strain curve was differentiated and the modulus was plotted as a function of strain for each formulation (FIGS. 5C and 5D). FIG. 5C illustrates a series of modulus-strain curves 500c illustrating the moduli of 5 wt % PEG-DA, 10 wt % PEG-DA, and 10 wt % PEG-A cured hydrogel specimens before heat treatment; and FIG. 5D illustrates a series of modulus-strain curves 500d illustrating the moduli of 5 wt % PEG-DA, 10 wt % PEG-DA, and 10 wt % PEG-A cured hydrogel specimens after heat treatment. Since these materials exhibit non-linear elasticity, the Young's modulus was replaced by tangent modulus, which is the slope at a given point of the stress-strain curve. Depending on the strain, the moduli ranged from 1.2-15.6 MPa, 1.3-19.1 MPa, and 1.5-8.4 MPa for 5 wt % PEG-DA, 10 wt % PEG-DA, and 10 wt % PEG-A respectively.

Figure 5E:
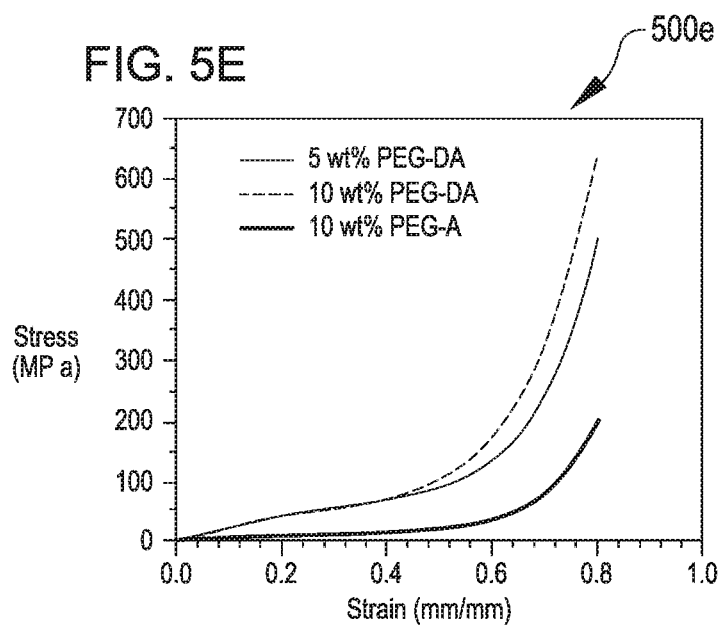
FIG. 5E is a graphical representation of a stress/strain curve of cured biopastics illustrating the relationship for non-thermally cured samples.
Figure 5F:
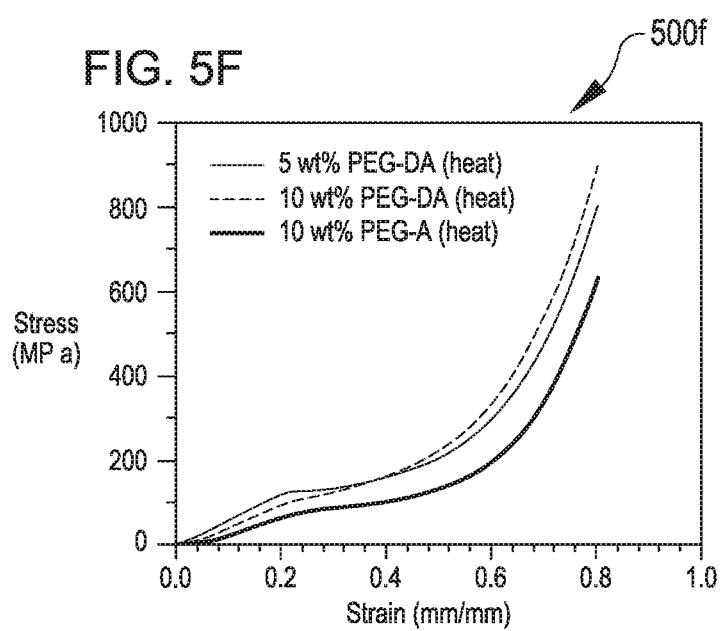
FIG. 5F is a graphical representation of a stress/strain curve of cured biopastics illustrating the relationship for thermally cured and dehydrated samples

FIGS. 5E and 5F are graphical representations of the stress/strain curves of cured bioplastics formed from PEG-DA and PEG-A, in accordance with various embodiments, FIG. 5E illustrating the relationship for non-thermally cured samples 500e, and FIG. 5F illustrating the relationship for thermally cured and dehydrated samples 500f. Similar to the hydrogels, the bioplastics with PEG-A additive exhibited a lower modulus than the bioplastics with PEG-DA (73 MPa and 473 MPa, respectively). The thermally cured and dehydrated samples (FIG. 5F) also had a much higher modulus than the non-thermally cured samples (FIG. 5E). For example, the 10 wt % PEG-A bioplastic had a compressive modulus of 73 MPa without the thermal cure and increased to 382 MPa with the thermal cure. Surprisingly, the thermally cured 5 wt % PEG-DA bioplastic had the highest modulus of all formulations, 638 MPa, attributable to the greater proportion of MA-BSA present relative to the total polymer content. The higher concentration of MA-BSA increased the number of inter-protein non-covalent interactions that could occur. The mechanical properties of the thermosets printed with various resin formations are shown below at Table 1, and the mechanical properties of the hydrogel structures at equilibrium swelling are shown below at Table 2.

TABLE 1

Mechanical Properties of Printed Thermoset Polymers with Various Resin Formulations

| Comonomer (wt %) | Thermal Cure | Compressive Modulus (MPa) | Compressive Strength* (MPa) | $\sigma_{max}$ (MPa) | Toughness (MJ/m$^3$) |
|---|---|---|---|---|---|
| PEG-DA (5) | No | 284 | 40 | 499 | 79 |
| PEG-DA (5) | Yes | 638 | 120 | 804 | 173 |
| PEG-DA (10) | No | 296 | 43 | 633 | 101 |
| PEG-DA (10) | Yes | 473 | 97 | 896 | 198 |
| PEG-A (10) | No | 73 | 7 | 203 | 17 |
| PEG-A (10) | Yes | 382 | 63 | 635 | 107 |

*at 20% deformation

TABLE 2

Mechanical Properties of Hydrogel Structures at Equilibrium Swelling

| Comonomer (wt %) | Thermal Cure | Compressive Modulus (MPa) | Compressive Strength* (MPa) | $\varepsilon_{max}$ (MPa) | Toughness (MJ/m$^3$) |
|---|---|---|---|---|---|
| PEG-DA (5) | No | 2.17 | 0.68 | 0.28 | 0.089 |
| PEG-DA (5) | Yes | 2.49 | 3.49 | 0.45 | 0.481 |
| PEG-DA (10) | No | 6.26 | 2.43 | 0.35 | 0.391 |
| PEG-DA (10) | Yes | 6.06 | 4.27 | 0.39 | 0.596 |
| PEG-A (10) | No | 3.27 | 0.86 | 0.26 | 0.106 |
| PEG-A (10) | Yes | 3.36 | 1.75 | 0.34 | 0.230 |

Figure 6A:
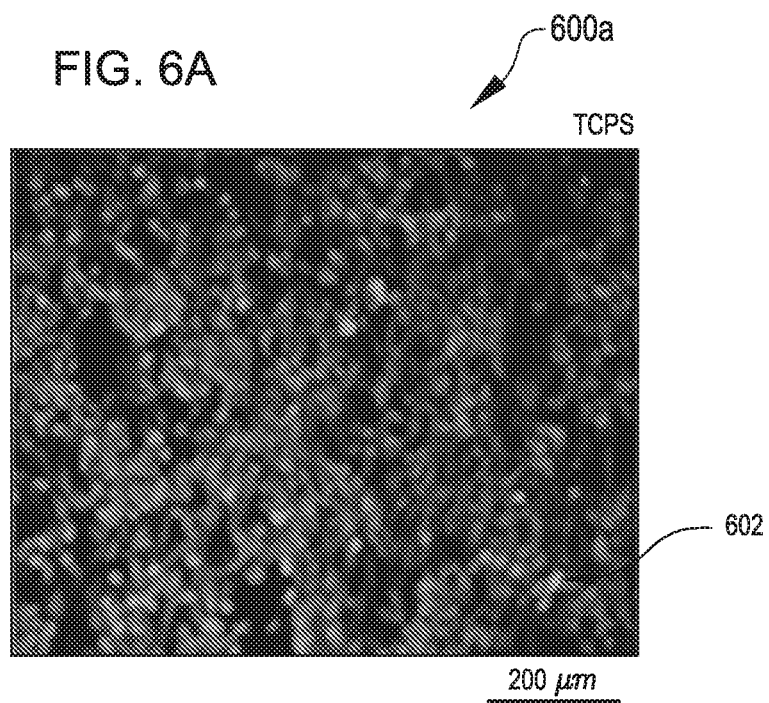
Figure 6B:
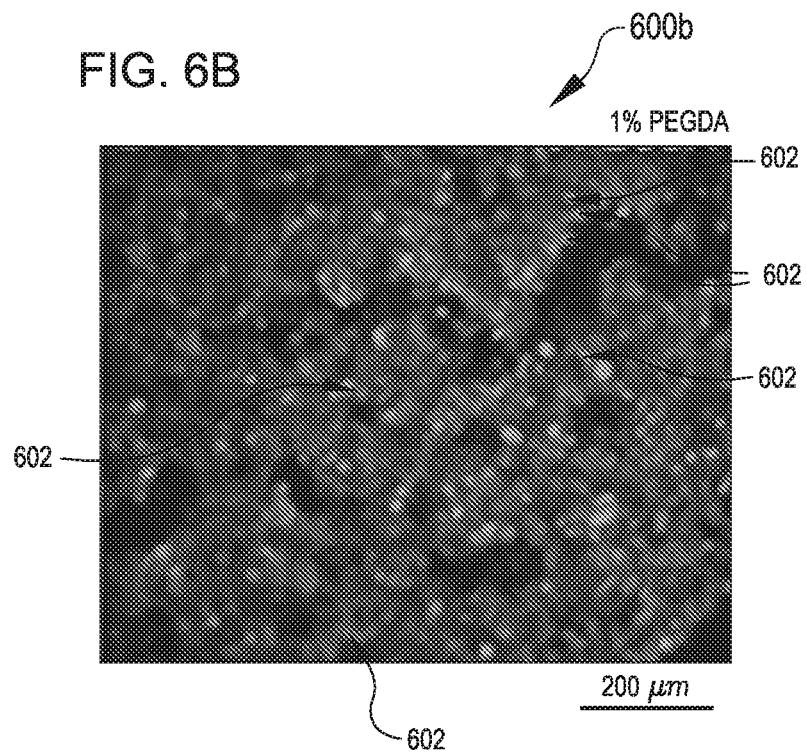
Figure 6C:
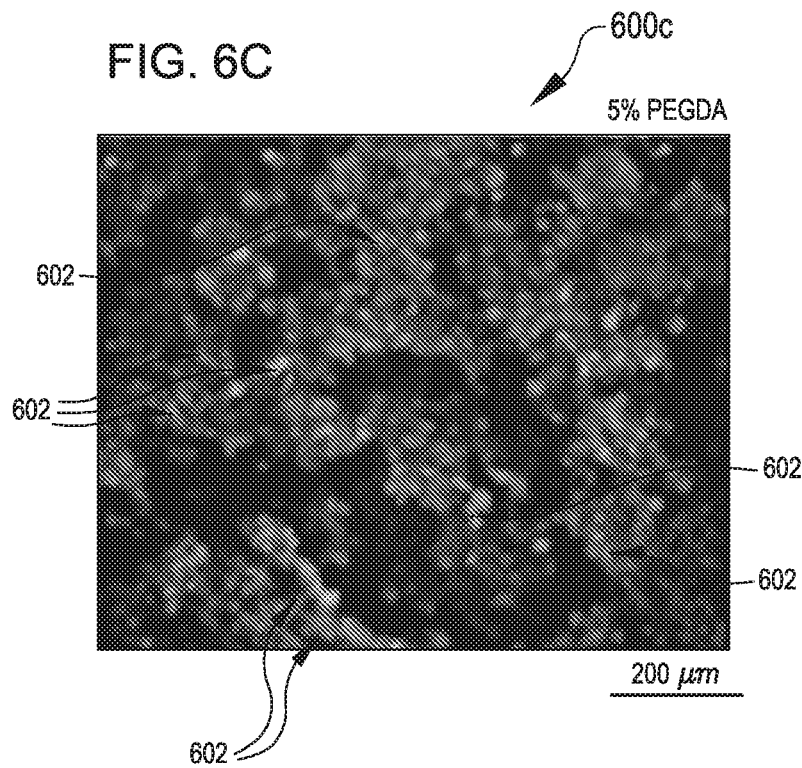
Figure 6D:
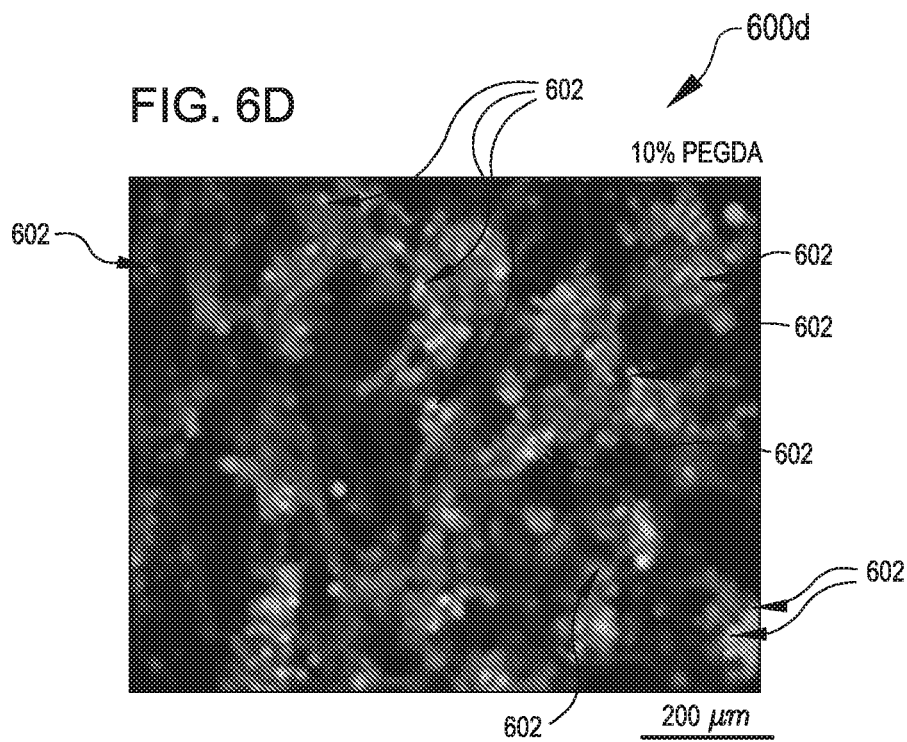

Biocompatability: Using a fluorescent live/dead assay, the biocompatibility of the various hydrogel formulations with 3T3 fibroblasts was assessed after a 21-day culture period (FIGS. 6A-6E). FIG. 6A is a fluorescent microscope image 600a illustrating cell viability on a control substrate of tissue culture polystyrene (TCPS), with bright (green) markers in live cell colonies 602 illustrating viability. FIG. 6B is a second fluorescent microscope image illustrating cell viability on a hydrogel substrate using 1% PEG-DA comonomer, demonstrating high cell viability by the numerous and highly visible fluorescent cell colonies 602. Prevalent viable cell colonies were visibile in fluorescent microscope images of substrates 600c, 600d, and 600e using 5% PEG-DA (FIG. 6C, 600c); using 10% PEG-DA (FIG. 6D, 600d), and using 10% PEG-A (FIG. 6E, 600e). Overall cell viability was good (>95%), with some hydrogel samples outperforming even conventional tissue-culture plastic.

The greatest viability was observed on the 1% PEG-DA hydrogels, while the viability decreased as a function of PEG-DA content; this difference was not statistically significant. FIG. 7 is a graphical illustration of cell viability of images 600a-600e, illustrating that all of the hydrogel structures exhibited cell viability meeting or exceeding that of the control TCPS. Interestingly, it also appeared that as PEG-DA content increased, cultured fibroblasts displayed a tendency to form 3D aggregates that formed on top of a layer of adherent cells. This is likely due to a reduction in potential binding sites for cells, as PEG is a typically anti-fouling and adhesion-resistant material and would induce proliferating cells to preferentially adhere to neighboring cells, rather than to the hydrogel itself. Indeed, such behavior has been observed in other PEG-containing hydrogels that have not been otherwise modified with cell-adhesion ligands. While further studies would need to be conducted, particularly with other cell types that do not readily adhere to materials, this property could allow for the use of these hydrogels in applications in which some degree of cell adhesion resistance is desired, such as those that involve contact with flowing blood.

Printed structures are water absorbent, and can be repeatedly dehydrated and rehydrated, as shown in FIG. 8. FIG. 8 is an image 800 showing a printed compression disk fabricated at 0.5 cm diameter, hydrated and shown at equilibrium swelling 802 in which the disk expands up to about 1.0 to 1.2 cm (i.e., more than 100% increase by diameter), and in a dehydrated state 804 at which the printed compression disk decrease to approximately its initial size (i.e., down to about 0.5-0.6 cm diameter). Hydrogel structures can be repeatedly hydrated and dehydrated.

Figure 9:
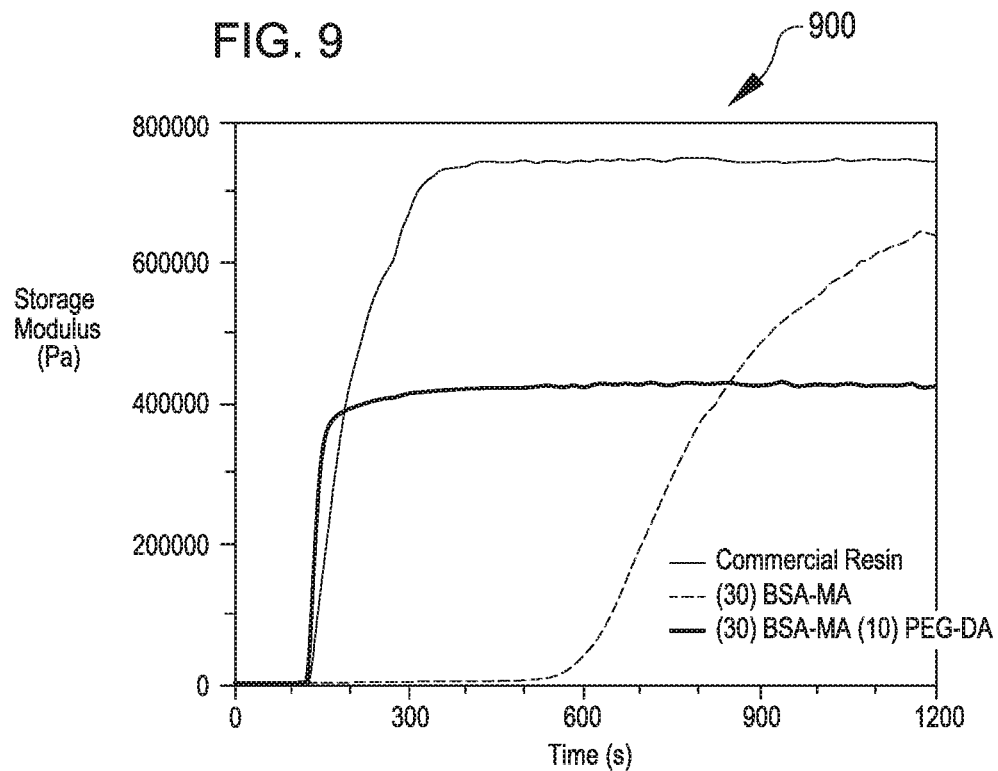
FIG. 9 is a graphical representation illustrating rheological information for a commercial resin and for resins containing BSA-MA.

Printed proteinaceous resin hydrogel structures as described herein can display comparable stiffness and elasticity to commercial resin hydrogels, as shown in FIG. 9. FIG. 9 is a graphical representation 900 illustrating rheological information (modulus as a function of cure time) for a commercial resin, for resin containing 30 wt % BSA-MA, and for resin containing 30 wt % BSA-MA and 10 wt % PEG-DA. The light source for curing the resins (365 nm) was activated at 120s. Although commercial resin achieved the highest storage modulus, both BSA-based formulations quickly achieved structurally functional stiffness, the formulation of BSA-MA and PEG-DA stiffening immediately upon activation of the UV light source.

Figure 10:
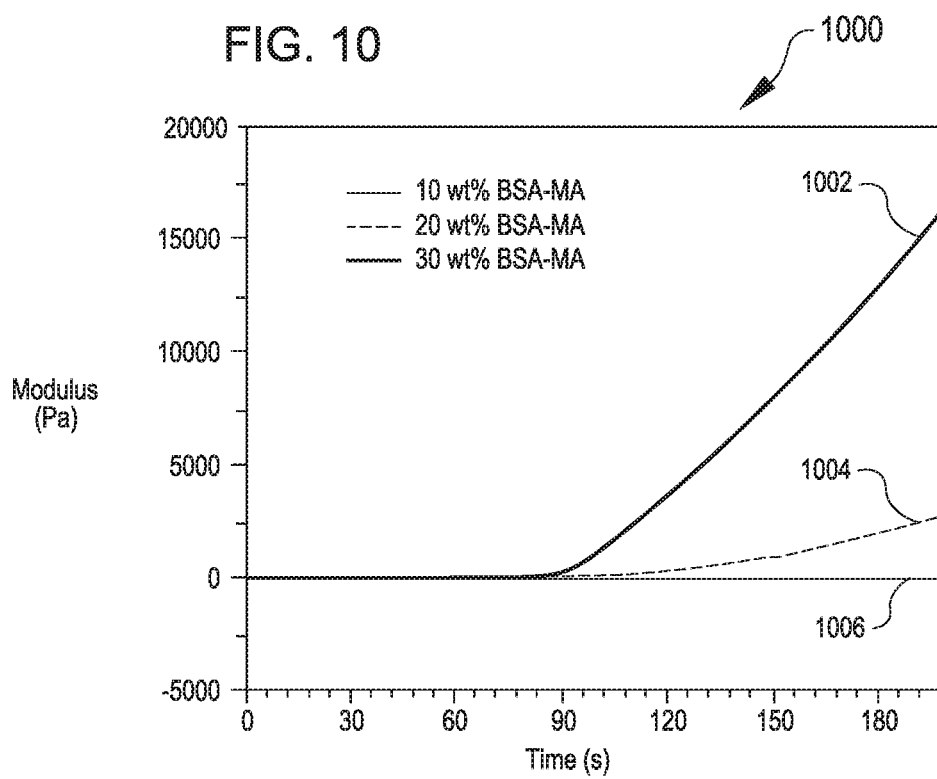
FIG. 10 is a graphical representation showing modulus as a function of photo cure time for resins containing varying amounts of BSA-MA.

Curing behavior can be tuned by the amount of BSA-MA contained in the resin. Additional rheological data is shown in FIG. 10. FIG. 10 is a graphical representation 1000 showing modulus as a function of photo cure time for resins containing 0.0748 wt % Ru(bpy) and 0.238 wt % SPS, with varying amounts of BSA-MA; 10 wt % BSA-MA (1002), 20 wt % BSA-MA (1004), and 30 wt % BSA-MA (1006). The light source (400 nm) was activated at 60 s. The viscosity of the BSA-MA resin solutions also varies depending on the amount of resin, as shown in Table 3:

TABLE 3

Viscosity in BSA-MA Resin vs. Resin Concentration

| BSA-MA quantity (wt %) | Viscosity (Pa s) |
|---|---|
| 10 | 0.005 |
| 20 | 0.012 |
| 30 | 0.035 |
| 35 | 1.564 |
| 40 | 29.463 |

The viscosity and photo-cure rates of BSA-MA resin forumlations with varying amounts of comonomer are shown in Table 4, below.

TABLE 4

Viscosity and Photo-Cure Rates of BSA-MA Resins vs. Comonomer Concentration

| Sample | Viscosity (Pa s) | Modulus Slope (Pa/s) | Crossover time (s) | Crossover modulus (Pa) |
|---|---|---|---|---|
| No comonomer | 0.035 | 0.9 | 18 | 17 |
| 1 wt % PED-DA | 0.020 | 947.7 | 5.5 | 32 |
| 5 wt % PEG-DA | 0.061 | 14378.0 | 4 | 20.3 |
| 10 wt % PED-DA | 0.267 | 26904.0 | 2.15 | 29.03 |
| 10 wt % PEG-A | 0.072 | 16602.0 | 3.16 | 17.0 |

Figure 11:
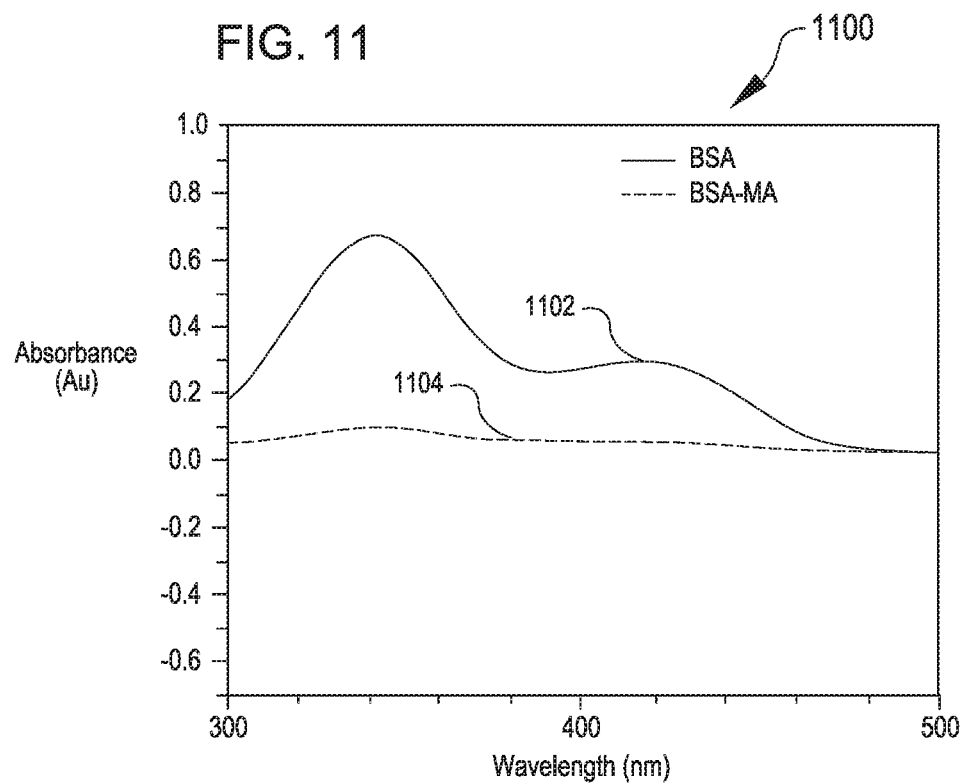
FIG. 11 is a graphical representation 1100 showing the UV-vis absorbance spectrum of BSA and BSA-MA as an indicator of percent functionalization.

TNBS Assay: The percent functionalization for BSA-MA resins was calculated using a 2,4,6-Trinitrobenzene Sulfonate (TNBS) assay. Primary amines react with TNBS to form a compound that absorbs strongly at 335 nm. The setup is as follows, BSA and BSA-MA were dissolved in CB buffer at a concentration of 20 μg/mL. 0.25 mL of 0.01% (w/v) solution of TNBS was added to 0.5 mL of each protein solution. The samples were incubated at 37° C. for 2 hours. To quench the reaction, 0.25 mL of 10% SDS and 0.125 mL of 1N HCl were added to each sample. The absorbance of each solution was measured at 335 nm, as shown in FIG. 11. FIG. 11 is a graphical representation 1100 showing the UV-vis absorbance spectrum of BSA and BSA-MA after incubation with TNBS: BSA (1102) and BSA-MA (1104).

Figure 12:
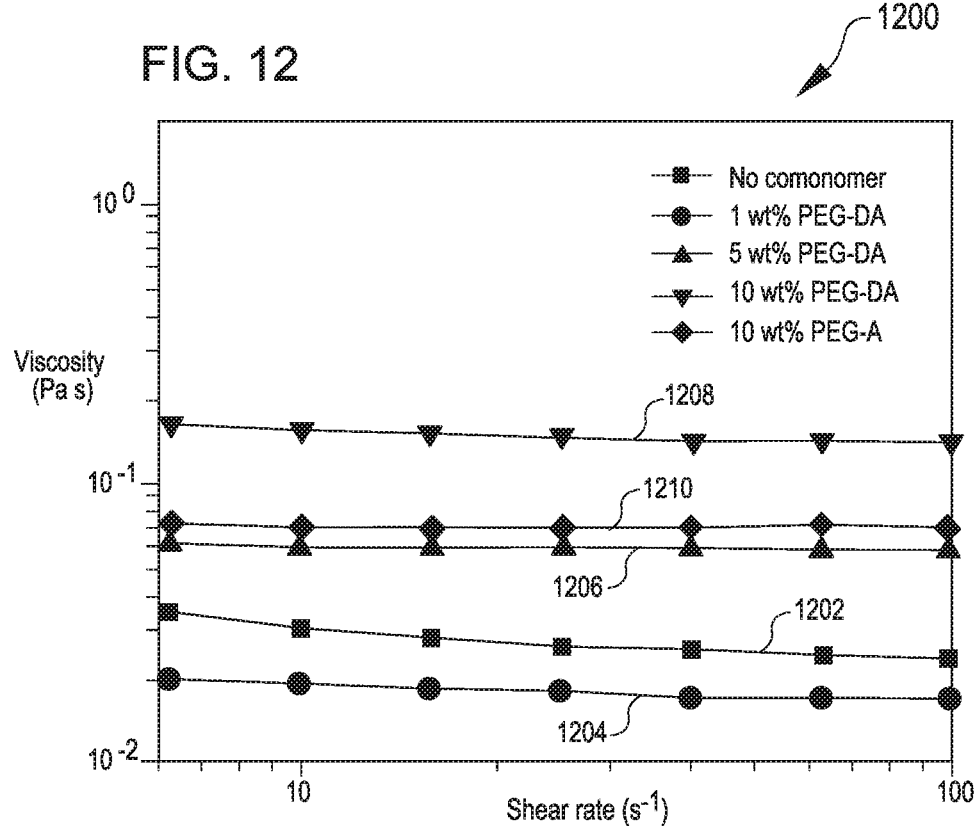
FIG. 12 is a graphical representation that shows shear behavior of BSA-MA resins containing varying amounts of comonomer.

FIG. 12 is a graphical representation 1200 that shows shear behavior (i.e., viscosity as a function of shear rate) of 30 wt % BSA-MA resins containing varying amounts of comonomer: BSA-MA resin without comonomer (1202), with 1 wt % PEG-DA (1204), with 5 wt % PEG-DA (1206), with 10 wt % PEG-DA (1208), and with 10 wt % PEG-A (1210). Importantly, viscosity remains low (i.e., less than 1 Pa·s) for all disclosed resin formulations, and is independent of shear rate. This property contributes to the efficacy of the resins for SLA printing, as consistent and low viscosity is important for resin settling between printing layers.

Figure 13:
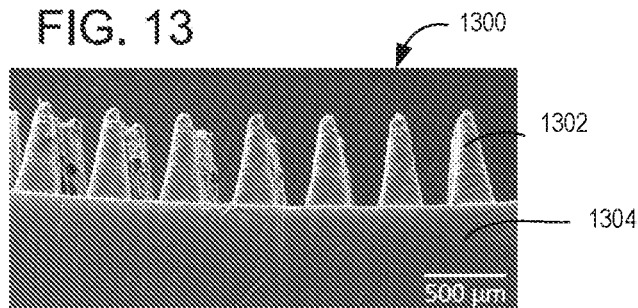
FIG. 13 is an electron micrograph of a printed structure of cured BSA-MA resin forming fine needle-like sub-millimeter structures on a resin surface.
Figure 14:
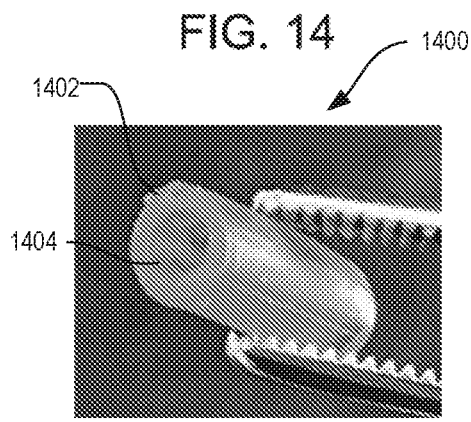
FIG. 14 is a microscope image of a printed structure of cured BSA-MA resin forming a fine sub-centimeter hollow tube.
Figure 15:
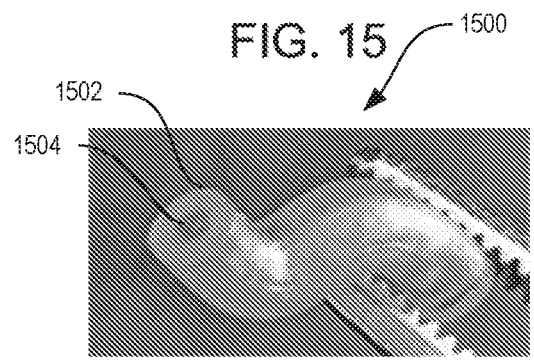
FIG. 15 is a microscope image of a printed structure of cured BSA-MA resin forming a fine sub-centimeter hollow tube with bends.
Figure 16:
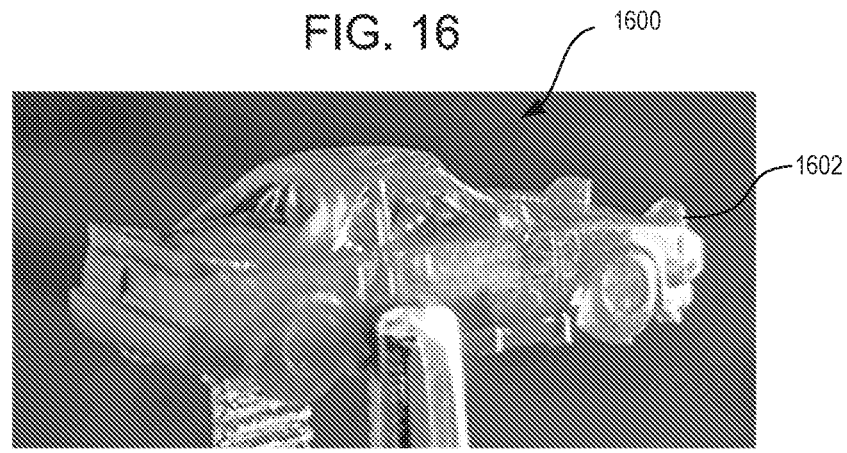
FIG. 16 is a microscope image of a printed structure of cured BSA-MA resin forming a complex 3D-printed structure (model) at centimeter scale with sub-millimeter fine features.

Printable structures and print resolution: Photoreactive proteinaceous resins produced according to the methods described above were formed into a variety of small (i.e., sub-cm or sub-mm) shapes as a proof of concept to illustrate the resolution and fidelity of 3D printed structures using the proteinaceous resins in FIGS. 13-16. FIG. 13 is an SEM image 1300 illustrating ultrafine sub-mm needle-like features 1302 on a substrate 1304 printed from a photoreactive proteinaceous resin, according to various embodiments described herein. FIG. 14 is a microscope image 1400 of a sub-cm scale tube 1402 with a hollow lumen 1404 printed in the same manner; and FIG. 15 is a microscope image 1500 of a similar sub-cm scale tube 1502 with a hollow lumen 1504 that has a serpentine shape. A wide variety of minute, biocompatible and/or biodegradable or absorbable structures can be reproduced via 3D printing using the photoreactive proteinaceous resins described herein. FIG. 16, for example, is a microscope image 1600 illustrating a model car 1602 with ultrafine, sub-mm features.

Compression data: The nonlinear stress-strain curve data were fit to a 2nd degree polynomial using Matlab. The first derivative was then plotted versus strain to give the modulus as a function of strain. Compression data for the various BSA-MA resins is shown below with reference to Table 5, comparing formulations using different resin comonomers by concentration, with and without heat treatment.

TABLE 5

BSA-MA Compression Data

| Sample (wt %)/treatment | $\bar{E}$ (MPa) | $E_{max}$ | a | b | $\sigma_{max}$ (MPa) | $\varepsilon_{max}$ | Toughness (MJ/m³) |
|---|---|---|---|---|---|---|---|
| 5 PEG-DA | 2.5 | 2.9 | 2.0 | 3.1 | 0.68 | 0.28 | 0.089 |
| 5 PEG-DA (heat) | 7.2 | 15.6 | 1.2 | 37.2 | 3.49 | 0.45 | 0.481 |
| 10 PEG-DA | 6.5 | 7.8 | 5.1 | 7.7 | 2.43 | 0.35 | 0.391 |
| 10 PEG-DA (heat) | 10.2 | 19.1 | 1.3 | 45.1 | 4.27 | 0.39 | 0.596 |
| 10 PEG-A | 3.7 | 3.6 | 3.2 | 1.6 | 0.86 | 0.26 | 0.106 |
| 10 PEG-A (heat) | 5.0 | 8.4 | 1.5 | 20.1 | 1.75 | 0.34 | 0.230 |

Swelling ratios and percent mass loss for various resin formations, by percent comonomer and heat-treated and non-heat-treated, are shown below with reference to Table 6.

TABLE 6

Swelling Ratios and Mass Loss of various Resin Formulations

| Sample | Swelling ratio | % mass loss |
|---|---|---|
| 5 PEG-DA | 3.45 | 2.8 |
| 5 PEG-DA (heat) | 2.28 | 1.2 |
| 10 PEG-DA | 2.64 | 5.2 |
| 10 PEG-DA (heat) | 2.21 | 0.3 |
| 10 PEG-A | 3.32 | 12.0 |
| 10 PEG-DA (heat) | 2.64 | 3.9 |

Interestingly, the printed bioplastics that were tested in their dehydrated state did not fail by brittle fracture. Instead, they exhibited plastic deformation and flattened into a disk under compressive load. FIG. 17 shows a representative compressive stress versus strain curve 1700 for a dehydrated sample of 30 wt %. MA-BSA and highlights three distinct regions in the graph. Beyond the linear elastic region 1701, there is a distinct yield point 1704, beyond which plastic deformation occurs in region 1702 before failure in 1703. We attribute this behavior to the high molecular weight and the folded structure of the MA-BSA, which can become unfolded and stretched as the load is increased.

Other variations are within the spirit of the present invention. Thus, while the invention is susceptible to various modifications and alternative constructions, certain illustrated embodiments thereof are shown in the drawings and has been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

Specific elements of any foregoing embodiments can be combined or substituted for elements in other embodiments. Moreover, the inclusion of specific elements in at least some of these embodiments may be optional, wherein further embodiments may include one or more embodiments that specifically exclude one or more of these specific elements. Furthermore, while advantages associated with certain embodiments of the disclosure have been described in the context of these embodiments, other embodiments may also exhibit such advantages, and not all embodiments need necessarily exhibit such advantages to fall within the scope of the disclosure.

In the following, further examples are described to facilitate the understanding of the invention:

Example A. A method of preparing a biocompatible structure, the method comprising:
 preparing a photopolymerizable protein resin by combining an aqueous solution of a water soluble acrylated or methacrylated protein with a photoreactive comonomer; and
 printing the photopolymerizable protein resin into a structure by application of light in a range of 200-1000 nm, preferably 200-500 nm to cure the photopolymerizable protein resin into the structure.

Example B. The method of the preceding example, wherein preparing the photopolymerizable protein resin further comprises combining the aqueous solution with a water soluble acrylated or methacrylated comonomer comprising one or more acryl or methacryl chemical groups.

Example C. The method of the preceding example, wherein the water soluble acrylated or methacrylated comonomer comprises one of: hydroxyethyl acrylate (HEA), N-isopropyl acrylamide (NIPAM), poly(ethylene glycol) acrylate (PEG-A), poly(ethylene glycol) diacrylate, hydroxyethyl methacrylate (HEMA), acrylamide, and dimethylaminoethyl methacrylate (DMAEMA.

Example D. The method of any one of the preceding examples, wherein the photoreactive compound is a photosensitizer or a photoradical generator.

Example E. The method of any one of the preceding examples, further comprising preparing the aqueous solution by treating an isolated water soluble globular protein in solution with methacrylic anhydride to form the acrylated or methacrylated protein.

Example F. The method of any one of the preceding examples, wherein the isolated water soluble globular protein in solution has a concentration of at least 15% by mass, and has a viscosity of less than 10 Pa·s, preferably less than 5 Pa·s, preferably less than 1 Pa·s.

Example G. The method of any one of the preceding examples, wherein:
 the water soluble acrylated or methacrylated protein comprises BSA-MA at a concentration between 1 and 45 wt %;
 the photoreactive comonomer comprises one of a photosensitizer or photoradical generator at a concentration between 0.00748 and 10 wt %; and
 preparing the photopolymerizable protein resin further comprises:
  dissolving a water soluble acrylated or methacrylated comonomer in the aqueous solution at a concentration of between 0 and 50 wt %; and
  dissolving a radical generator in the aqueous solution to a concentration of between 0 and 10 wt %, preferably between 0.01 and 1.0 wt %.

Example H. The method of any one of the preceding examples, wherein printing the photopolymerizable protein resin comprises sequentially exposing the photopolymerizable protein resin to irradiation in a patternwise manner one or more times.

Example I. The method of any one of the preceding examples, further comprising drying the cured photopolymerizable protein resin to form a biocompatible bioplastic.

Example J. The method of any one of the preceding examples, further comprising culturing live cells on the structure.

Example K. The method of any one of the preceding examples, further comprising:
 receiving 3D structure data corresponding to a physical structure; and
 printing the structure based on the received 3D structure data.

Example L. The method of any one of the preceding examples, wherein the water soluble acrylated or methacrylated protein has a concentration of at least 15 wt %, preferably at least 20 wt %, preferably at least 30 wt %.

Example M. The method of any one of the preceding examples, wherein the photopolymerizable protein resin has a viscosity of less than 10 Pa·s, preferably less than 5 Pa·s, preferably less than 1 Pa·s.

Example N. The method of any one of the preceding examples, wherein printing the photopolymerizable protein resin into a structure comprises printing one of a cell scaffold, cellular support structure, or surgical implant.

Example O. The method of any one of the preceding examples, further comprising:
 irradiating the structure to further cross-link the photopolymerizable protein resin; and
 thermally curing the structure.

Example P. A photopolymerizable protein resin, comprising:
an aqueous solution comprising:
a water soluble globular protein with surface lysines, preferably BSA-MA, at a concentration of between 1 and 45 wt %, preferably between 10 and 35 wt %;
a photosensitizer or photoradical generator at concentration of between 0.00748 and 10 wt %, preferably between 0.01 and 1.0 wt %;
acrylated or methacrylated comonomer in water at a concentration of between 0 and 50 wt %; and
a radical at a concentration of between 0 and 10 wt %, preferably between 0.01 and 1.0 wt %.

Example Q. A bioplastic structure, comprising:
a cured photopolymerizable protein resin comprising:
a water soluble globular protein with surface lysines, preferably BSA-MA, at a concentration of between 1 and 45 wt %, preferably between 10 and 35 wt %;
acrylated or methacrylated comonomer at a concentration of between 0 and 50 wt %;
a photosensitizer or photoradical generator at concentration of between 0.00748 and 10 wt %, preferably between 0.01 and 1.0 wt %; and
a radical at a concentration of between 0 and 10 wt %, preferably between 0.01 and 1.0 wt %, wherein the aqueous solution has been cured by exposure to light in the range of 200 to 1000 nm.

Example R. A method of preparing a biocompatible protein resin for 3D printing, the method comprising:
treating an isolated water soluble globular protein in solution with methacrylic anhydride to form an aqueous solution of acrylated or methacrylated protein; and
preparing a photopolymerizable protein resin by combining the aqueous solution of water soluble acrylated or methacrylated protein with a photoreactive compound.

Example S. The method of any one of the preceding examples, wherein preparing the photopolymerizable protein resin further comprises combining the aqueous solution with a water soluble acrylated or methacrylated comonomer comprising one or more acryl or methacryl chemical groups.

Example T. The method of any one of the preceding examples, wherein the water soluble acrylated or methacrylated comonomer comprises one of: hydroxyethyl acrylate (HEA), N-isopropyl acrylamide (NIPAM), poly(ethylene glycol) acrylate (PEG-A), poly(ethylene glycol) diacrylate, hydroxyethyl methacrylate (HEMA), acrylamide, and dimethylaminoethyl methacrylate (DMAEMA).

Example U. The method of any one of the preceding examples, wherein the photoreactive compound is a photosensitizer or a photoradical generator.

Example V. The method of any one of the preceding examples, wherein:
the water soluble acrylated or methacrylated protein comprises BSA-MA at a concentration between 1 and 50 wt %;
the photoreactive compound comprises one of a photosensitizer or photoradical generator at a concentration between 0.00748 and 10 wt %; and
preparing the photopolymerizable protein resin further comprises:
dissolving a water soluble acrylated or methacrylated comonomer in the aqueous solution at a concentration of between 0 and 50 wt %; and
dissolving a radical generator in the aqueous solution to a concentration of between 0 and 10 wt %, preferably between 0.01 and 1.0 wt %.

Example W. The method of any one of the preceding examples, wherein the water soluble acrylated or methacrylated protein has a concentration of at least 15 wt %, preferably at least 20 wt %, preferably at least 30 wt %.

Example X. The method of any one of the preceding examples, wherein the photopolymerizable protein resin has a viscosity of less than 10 Pa·s, preferably less than 5 Pa·s, preferably less than 1 Pa·s.

Example Y. The method of any one of the preceding examples, wherein the isolated water soluble globular protein in solution has a concentration of at least 15% by mass, and has a viscosity of less than 10 Pa·s, preferably less than 5 Pa·s, preferably less than 1 Pa·s.

Example Z. The method of any one of the preceding examples, further comprising:
printing the photopolymerizable protein resin into a structure by application of light in a range of 200-1000 nm, preferably 200-500 nm to cure the photopolymerizable protein resin into the structure.

Example AA. The method of any one of the preceding examples, wherein printing the photopolymerizable protein resin comprises sequentially exposing the photopolymerizable protein resin to irradiation in a patternwise manner one or more times.

Example AB. The method of any one of the preceding examples, further comprising drying the cured photopolymerizable protein resin to form a bioplastic.

Example AC. The method of anyone of the preceding examples, further comprising culturing live cells on the structure.

Example AD. The method of any one of the preceding examples, further comprising:
receiving 3D structure data corresponding to a virtual representation of a physical structure; and
printing the structure based on the received 3D structure data.

Example 1.9E. The method of any one of the preceding examples, wherein printing the photopolymerizable protein resin into a structure comprises printing one of a cell scaffold, cellular support structure, or surgical implant.

Example AF. The method of any one of the preceding examples, further comprising:
irradiating the structure to further cross-link the photopolymerizable protein resin; and
thermally curing the structure.

What is claimed is:

1. A method of preparing a biocompatible structure, the method comprising:
preparing a photopolymerizable protein resin by combining an aqueous solution of a water soluble acrylated protein or a water soluble methacrylated protein with a photoreactive compound; and
printing the photopolymerizable protein resin into a structure by application of light in a range of 200-1000 nm to cure the photopolymerizable protein resin into the biocompatible structure.

2. The method of claim 1, wherein preparing the photopolymerizable protein resin further comprises combining the aqueous solution of the water soluble acrylated protein or the water soluble methacrylated protein with a water soluble acrylated or methacrylated comonomer comprising one or more acryl or methacryl chemical groups.

3. The method of claim 2, wherein the water soluble acrylated or methacrylated comonomer comprises at least one compound selected from hydroxyethyl acrylate (HEA), N-isopropyl acrylamide (NIPAM), poly (ethylene glycol) acrylate (PEG-A), poly (ethylene glycol) diacrylate, hydroxyethyl methacrylate (HEMA), acrylamide, and dimethylaminoethyl methacrylate (DMAEMA); and the photoreactive compound is a photosensitizer or a photoradical generator.

4. The method of claim 1, further comprising preparing the aqueous solution of the water soluble acrylated protein or the water soluble methacrylated protein by treating an isolated water soluble globular protein in solution with (i) acrylic anhydride to form the water soluble acrylated protein, or (ii) methacrylic anhydride to form the water soluble methacrylated protein.

5. The method of claim 4, wherein the isolated water soluble globular protein in solution has a concentration of at least 15% by mass and has a viscosity of less than 10 Pa·s.

6. The method of claim 1, wherein:
the water soluble acrylated protein or the water soluble methacrylated protein comprises BSA-MA at a concentration between 1 and 50 wt %;
the photoreactive compound comprises one of a photosensitizer or photoradical generator at a concentration between 0.00748 and 10 wt %; and
preparing the photopolymerizable protein resin further comprises:
dissolving a water soluble acrylated or methacrylated comonomer in the aqueous solution of the water soluble acrylated protein or the water soluble methacrylated protein at a concentration of between 0 and 50 wt %; and
dissolving a radical generator in the aqueous solution of the water soluble acrylated protein or the water soluble methacrylated protein to a concentration of between 0 and 10 wt %.

7. The method of claim 1, wherein printing the photopolymerizable protein resin comprises sequentially exposing the photopolymerizable protein resin to irradiation in a pattern-wise manner one or more times.

8. The method of claim 1, further comprising:
(i) drying the cured photopolymerizable protein resin to form a bioplastic;
(ii) culturing live cells on the structure;
(iii) receiving 3D structure data corresponding to a virtual representation of a physical structure and printing the structure based on the received 3D structure data;
(iv) irradiating the structure to further cross-link the photopolymerizable protein resin and thermally curing the structure; or
(v) any combination of (i), (ii), (iii), and (iv).

9. The method of claim 1, wherein the water soluble acrylated protein or the water soluble methacrylated protein has a concentration of at least 15 wt % and the photopolymerizable protein resin has a viscosity of less than 10 Pa·s.

10. The method of claim 1, wherein
printing the photopolymerizable protein resin into the structure comprises printing at least one structure selected from a cell scaffold, a cellular support structure, and surgical implant.

11. A photopolymerizable protein resin, comprising:
a water soluble acrylated protein or the water soluble methacrylated protein at a concentration of between 1 and 45 wt %;
a photosensitizer or photoradical generator at concentration of between 0.00748 and 10 wt %
acrylated or methacrylated comonomer in water at a concentration of between 0 and 50 wt %; and
a radical at a concentration of between 0 and 10 wt %.

12. A bioplastic structure, comprising:
a photopolymerizable protein resin that has been cured by exposure to light in the range of 200 to 1000 nm, wherein the photopolymerizable protein resin comprises:
a water soluble globular protein at a concentration of between 1 and 45 wt %
acrylated or methacrylated comonomer at a concentration of between 0 and 50 wt %;
a photosensitizer or photoradical generator at concentration of between 0.00748 and 10 wt %; and
a radical at a concentration of between 0 and 10 wt %.

13. A method of preparing a biocompatible protein resin for 3D printing, the method comprising:
treating an isolated water soluble globular protein in solution with acrylic anhydride or methacrylic anhydride to form an aqueous solution of water soluble acrylated protein or water soluble methacrylated protein; and
preparing a photopolymerizable protein resin by combining the aqueous solution of the water soluble acrylated protein or the water soluble methacrylated protein with a photoreactive compound.

14. The method of claim 13, wherein preparing the photopolymerizable protein resin further comprises combining the aqueous solution of the water soluble acrylated protein or the water soluble methacrylated protein with a water soluble acrylated or methacrylated comonomer comprising one or more acryl or methacryl chemical groups.

15. The method of claim 14, wherein the water soluble acrylated or methacrylated comonomer comprises one of: hydroxyethyl acrylate (HEA), N-isopropyl acrylamide (NI-PAM), poly (ethylene glycol) acrylate (PEG-A), poly (ethylene glycol) diacrylate, hydroxyethyl methacrylate (HEMA), acrylamide, and dimethylaminoethyl methacrylate (DMAEMA); and the photoreactive compound is a photosensitizer or a photoradical generator.

16. The method of claim 13, wherein:
the water soluble acrylated protein or the water soluble methacrylated protein comprises BSA-MA at a concentration between 1 and 50 wt %;
the photoreactive compound comprises one of a photosensitizer or photoradical generator at a concentration between 0.00748 and 10 wt %; and
preparing the photopolymerizable protein resin further comprises:
dissolving a water soluble acrylated or methacrylated comonomer in the aqueous solution at a concentration of between 0 and 50 wt %; and
dissolving a radical generator in the aqueous solution to a concentration of between 0 and 10 wt %.

17. The method of claim 13, wherein the water soluble acrylated protein or the water soluble methacrylated protein has a concentration of at least 15 wt %, the isolated water soluble globular protein in solution has a concentration of at least 15% by mass, and the photopolymerizable protein resin has a viscosity of less than 10 Pa·s.

18. The method of claim 13, further comprising:
(i) printing the photopolymerizable protein resin into a structure by application of light in a range of 200-1000 nm to cure the photopolymerizable protein resin into the structure;
(ii) drying the cured photopolymerizable protein resin to form a bioplastic;
(iii) culturing live cells on the structure;
(iv) receiving 3D structure data corresponding to a virtual representation of a physical structure and printing the structure based on the received 3D structure data;

(v) irradiating the structure to further cross-link the photopolymerizable protein resin and thermally curing the structure; or (vi) any combination of (i), (ii), (iii), (iv), and (v).

19. The method of claim 18, wherein printing the photopolymerizable protein resin comprises sequentially exposing the photopolymerizable protein resin to irradiation in a pattern-wise manner one or more times.

20. The method of claim 18, wherein printing the photopolymerizable protein resin into the structure comprises printing at least one structure selected from a cell scaffold, a cellular support structure, and a surgical implant.

* * * * *